United States Patent
Inoue et al.

(10) Patent No.: US 9,190,930 B2
(45) Date of Patent: *Nov. 17, 2015

(54) POWER CONVERSION DEVICE INCLUDING A PLURALITY OF LEGS CONNECTED IN PARALLEL, EACH LEG INCLUDING A PLURALITY OF UNIT CONVERTERS CONNECTED IN SERIES

(71) Applicant: Hitachi, Ltd., Chiyoda-ku, Tokyo (JP)

(72) Inventors: Shigenori Inoue, Hitachi (JP); Shuji Katoh, Hitachiota (JP)

(73) Assignee: Hitachi, Ltd., Tokyo (JP)

( * ) Notice: Subject to any disclaimer, the term of this patent is extended or adjusted under 35 U.S.C. 154(b) by 342 days.

This patent is subject to a terminal disclaimer.

(21) Appl. No.: 13/706,638

(22) Filed: Dec. 6, 2012

(65) Prior Publication Data

US 2013/0148392 A1    Jun. 13, 2013

(30) Foreign Application Priority Data

Dec. 7, 2011 (JP) ................................. 2011-267453

(51) Int. Cl.
| | | |
|---|---|---|
| *H02M 7/219* | (2006.01) | |
| *H02M 7/10* | (2006.01) | |
| *H02M 1/32* | (2007.01) | |
| *H02M 7/483* | (2007.01) | |
| *H02M 1/00* | (2007.01) | |

(52) U.S. Cl.
CPC .................. *H02M 7/10* (2013.01); *H02M 1/32* (2013.01); *H02M 7/483* (2013.01); *H02M 2001/0003* (2013.01); *H02M 2001/0064* (2013.01); *H02M 2007/4835* (2013.01)

(58) Field of Classification Search
CPC ..... H02M 7/2173; H02M 7/219; H02M 7/25; H02M 7/797
USPC .......................... 363/65, 67, 68, 71, 127, 132
See application file for complete search history.

(56) References Cited

U.S. PATENT DOCUMENTS

| | | | |
|---|---|---|---|
| 8,188,726 B2 * | 5/2012 | Chimento et al. | ......... 324/76.11 |
| 8,817,503 B2 * | 8/2014 | Inoue et al. | ..................... 363/68 |
| 2008/0204959 A1 | 8/2008 | Knapp et al. | |
| 2008/0232145 A1 | 9/2008 | Hiller et al. | |
| 2010/0085785 A1 | 4/2010 | Dommaschk et al. | |
| 2011/0019442 A1 * | 1/2011 | Yamada et al. | ................. 363/44 |
| 2011/0019449 A1 * | 1/2011 | Katoh et al. | ................. 363/124 |

(Continued)

FOREIGN PATENT DOCUMENTS

| | | |
|---|---|---|
| JP | 2009-506736 A | 2/2009 |
| JP | 2010-521130 A | 6/2010 |

(Continued)

OTHER PUBLICATIONS

European Search Report dated Jul. 4, 2014 (Ten (10) pages).

(Continued)

*Primary Examiner* — Jeffrey Sterrett
(74) *Attorney, Agent, or Firm* — Crowell & Moring LLP

(57) ABSTRACT

A power conversion device includes at least two legs connected in parallel each of which includes at least two unit converters connected in series, wherein at least one of the legs is formed using at least two kinds of unit converters including a first type unit converter capable of outputting a unipolar voltage and a second type unit converter capable of outputting a bipolar voltage.

14 Claims, 11 Drawing Sheets

(56) References Cited

U.S. PATENT DOCUMENTS

| | | |
|---|---|---|
| 2012/0026767 A1 | 2/2012 | Inoue et al. |
| 2012/0113698 A1* | 5/2012 | Inoue et al. ............... 363/123 |
| 2013/0148392 A1* | 6/2013 | Inoue et al. ............... 363/68 |
| 2013/0208519 A1* | 8/2013 | Yamamoto et al. ......... 363/67 |
| 2013/0223115 A1* | 8/2013 | Tsuchiya et al. ........... 363/68 |
| 2013/0308235 A1 | 11/2013 | Davies et al. |
| 2014/0016379 A1* | 1/2014 | Yamamoto et al. ......... 363/37 |
| 2014/0078796 A1* | 3/2014 | Inoue et al. ............... 363/68 |
| 2014/0211528 A1* | 7/2014 | Inoue et al. ............... 363/123 |
| 2014/0369096 A1* | 12/2014 | Hosokawa ................. 363/68 |

FOREIGN PATENT DOCUMENTS

| | | |
|---|---|---|
| JP | 2010-233411 A | 10/2010 |
| WO | WO 2005/124961 A1 | 12/2005 |
| WO | WO 2010/116806 A1 | 10/2010 |
| WO | WO 2011/042050 A1 | 4/2011 |
| WO | WO 2012/103936 A1 | 8/2012 |

OTHER PUBLICATIONS

M.M.C. Merlin et al: "A New Hybrid Multi-Level Voltage-Source Converter with DC Fault Blocking Capability", $9^{th}$ Institution of Engineering and Technology International Conference on AC and DC Power Transmission, Oct. 19, 2010, XP007917933, (Five (5) pages).

Japanese Office Action dated Jun. 9, 2015 (Five (5) pages).

* cited by examiner

POWER CONVERSION DEVICE INCLUDING A PLURALITY OF LEGS CONNECTED IN PARALLEL, EACH LEG INCLUDING A PLURALITY OF UNIT CONVERTERS CONNECTED IN SERIES

BACKGROUND OF THE INVENTION

1. Field of the Invention

The present invention relates to a power conversion device, and particularly to a power conversion device formed using an arm where a plurality of unit converters are connected in series.

2. Background Art

H. Akagi, "Classification, terminology, and applications of the modular multilevel converter (MMCC)", IEEE Trans. Power Electron., vol. 26, no. 11, November 2011, pp. 3119 to 3130 discloses a circuit configuration of four types of power conversion devices called a modular multilevel cascade converter (MMCC) and the applicability thereof.

Among the four types of MMCC, an MMCC-DSBC (Double-Star Bridge Cell), which uses a full bridge circuit as a unit converter and is formed from an arm where a plurality of unit converters are connected in series, is an AC-DC converter circuit type which is applicable to a self-excited DC power transmission system (VSC-HVDC).

Generally, an AC-DC converter has an AC terminal for linking to an AC system and a DC terminal for linking to a DC system. In the present specification, a voltage which is output to the AC system by the AC-DC converter is referred to as an AC output voltage, and a voltage which is output to the DC system by the AC-DC converter is referred to as a DC output voltage.

In a case where a DC overhead transmission line is used in the VSC-HVDC, a DC fault such as a DC ground fault or short-circuit caused by lightning, or the like, may occur.

If a DC fault occurs, there is a probability that the AC-DC converter will be damaged since overcurrent flows through semiconductor elements forming the AC-DC converter, and thus a protection operation for preventing damage, such as suppression or blocking of overcurrent, is required.

R. S. Whitehouse, "Technical Challenges of realizing multi-terminal networking with VSC", EPE 2011 discloses that it is not necessary to trip a circuit breaker on an AC system side when a DC fault occurs in an MMCC-DSBC. Hereinafter, a principle thereof will be described.

When a DC fault is detected, the MMCC-DSBC can control the switching timing of each switching element in the unit converter such that a DC output voltage becomes zero or a negative voltage, thereby suppressing a fault current from flowing into a DC fault point.

In addition, even in a state where the DC output voltage is controlled to become zero or a negative voltage, the MMCC-DSCC can generate an AC output voltage which resists against an AC system voltage, and it is possible to suppress a fault current from flowing into the DC fault point from an AC system. Therefore, it is possible to rapidly resume power transmission after removing the DC fault without tripping the circuit breaker on the AC system side.

On the other hand, in an MMCC-DSCC which uses a bidirectionalbidirectionalchopper circuit as a unit converter and is formed from an arm where a plurality of unit converters are connected in series, it is necessary to trip the circuit breaker on the AC system side when a DC fault occurs, and thus it takes time to resume power transmission after removing the DC fault.

SUMMARY OF THE INVENTION

All the unit converters of the MMCC-DSBC are full bridge circuits. For this reason, there is a problem in that compared with the MMCC-DSCC of which all the unit converters are bidirectionalbidirectionalchopper circuits, substantially twice the number of switching elements are required.

In addition, in the MMCC-DSBC, the number of switching elements which allow current to flow at any one time is also substantially twice that of the MMCC-DSCC, and thus there is a problem in that there is substantially twice the amount of loss.

According to an aspect of the present invention, a power conversion device includes at least two legs connected in parallel, each of which includes at least two unit converters having a power supply or an energy storage element, connected in series, wherein at least one of the legs is formed using at least two kinds of unit converters including a first type unit converter capable of outputting a unipolar voltage and a second type unit converter capable of outputting a bipolar voltage.

According to the present invention, it is possible to reduce costs and loss.

DETAILED DESCRIPTION OF THE INVENTION

Figure 1:
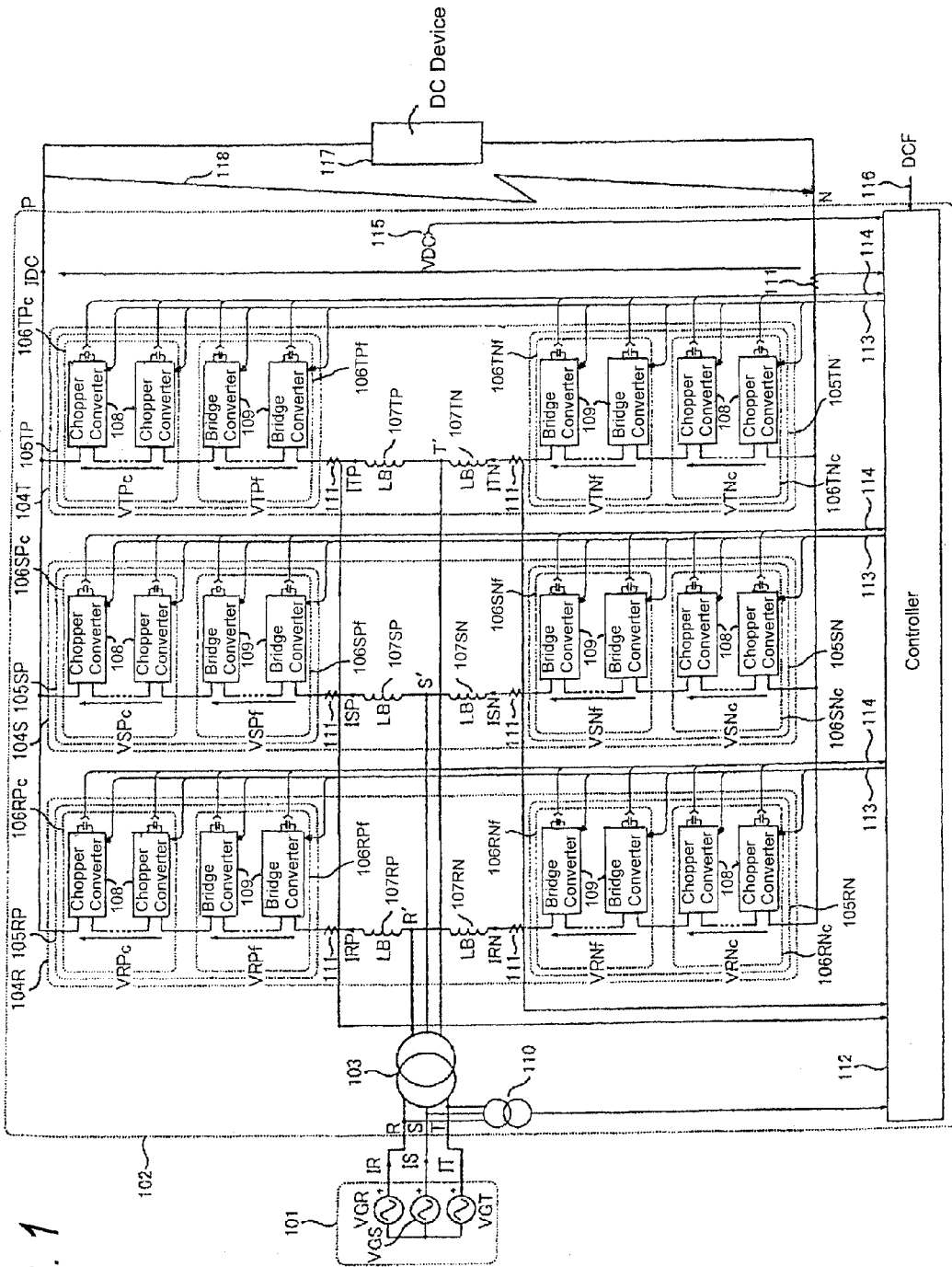
FIG. 1 is a diagram illustrating a power conversion device according to a first embodiment of the present invention.

Here, embodiments of the present invention will be described with reference to the drawings.

First Embodiment

The first embodiment of the present invention will be described.

In the first embodiment, each arm is constituted by two kinds of unit converters including a full bridge type unit converter and a bidirectional chopper type unit converter.

In a case of using a switching element with the same rating as that of the MMCC-DSBC in the related art, it is possible to achieve an effect of reducing the number of switching elements to about ¾ in the first embodiment.

Hereinafter, a configuration according to the first embodiment will be described with reference to FIG. 1. After the configuration is described, an operation principle according to the present embodiment and schematic operation waveforms will be described.

First, a description will be made of a connection state between a power conversion device 102 and external circuits.

The power conversion device 102 is connected to an AC system 101 via a transformer 103. In the present embodiment, the AC system 101 side of the transformer 103 is set as a primary side which is referred to as an R point, an S point, and a T point, and a secondary side of the transformer 103 is referred to as an R' point, an S' point, and a T' point.

In addition, the power conversion device 102 has DC terminals P point and N point, and a DC device 117 is connected between the P point and the N point. Here, the DC device 117 is shown as a representative of a DC power supply, a DC load, or a power conversion device. A power conversion device with the same configuration as the power conversion device 102 may be connected as the DC device 117.

In a case where the DC device 117 is an AC-DC converter, the power conversion device 102 and the DC device 117 form a DC power transmission system.

The power conversion device 102 includes a controller 112, and the controller 112 has a function of receiving a signal DCF from an external device via an external signal line 116.

A DC fault 118 is a path which is short-circuited between the P point and the N point when a DC fault described later occurs.

Hereinafter, an internal configuration of the power conversion device 102 will be described.

The power conversion device 102 includes the transformer 103, an R phase leg 104R, an S phase leg 104S, a T phase leg 104T, voltage sensors 110 and 115, current sensors 111, the controller 112, gate signal lines 113, and capacitor voltage detection lines 114.

The R phase leg 104R is a circuit where an RP arm 105RP, a first reactor 107RP, a second reactor 107RN, and an RN arm 105RN are connected in series. A connection point between the reactor 107RP and the reactor 107RN is connected to the R' point of the transformer 103, a terminal on an opposite side to a terminal connected to the reactor 107RP of the RP arm 105RP is connected to the P point, and a terminal on an opposite side to a terminal connected to the reactor 107RN of the RN arm 105RN is connected to the N point.

The S phase leg 104S is a circuit where an SP arm 105SP, a reactor (first reactor) 107SP, a reactor (second reactor) 107SN, and an SN arm 105SN are connected in series. A connection point of the reactor 107SP and the reactor 107SN is connected to the S' point of the transformer 103, a terminal on an opposite side to a terminal connected to the reactor 107SP of the SP arm 105SP is connected to the P point, and a terminal on an opposite side to a terminal connected to the reactor 107SN of the SN arm 105SN is connected to the N point.

The T phase leg 104T is a circuit where a TP arm 105TP, a reactor (first reactor) 107TP, a reactor (second reactor) 107TN, and a TN arm 105TN are connected in series. A connection point of the reactor 107TP and the reactor 107TN is connected to the T' point of the transformer 103, a terminal on an opposite side to a terminal connected to the reactor 107TP of the TP arm 105TP is connected to the P point, and a terminal on an opposite side to a terminal connected to the reactor 107TN of the TN arm 105TN is connected to the N point.

Next, an internal configuration of each arm will be described.

The RP arm 105RP is formed by serially connecting bidirectional chopper group 106RPc which includes M bidirectional chopper type unit converters 108 connected in series to a full bridge group 106RPf which includes N full bridge type unit converters 109 connected in series. An output voltage of the bidirectional chopper group 106RPc is indicated by VRPc, and an output voltage of the full bridge group 106RPf is indicated by VRPf.

The RN arm 105RN is formed by serially connecting a full bridge group 106RNf which includes N full bridge type unit converters 109 connected in series to a bidirectional chopper group 106RNc which includes M bidirectional chopper type unit converters 108 connected in series. An output voltage of the full bridge group 106RNf is indicated by VRNf, and an output voltage of the bidirectional chopper group 106RNc is indicated by VRNc.

The SP arm 105SP is formed by serially connecting a bidirectional chopper group 106SPc which includes M bidirectional chopper type unit converters 108 connected in series to a full bridge group 106SPf which includes N full bridge type unit converters 109 connected in series. An output voltage of the bidirectional chopper group 106SPc is indicated by VSPc, and an output voltage of the full bridge group 106SPf is indicated by VSPf.

The SN arm 105SN is formed by serially connecting a full bridge group 106SNf which includes N full bridge type unit converters 109 connected in series to a bidirectional chopper group 106SNc which includes M bidirectional chopper type unit converters 108 connected in series. An output voltage of the full bridge group 106SNf is indicated by VSNf, and an output voltage of the bidirectional chopper group 106SNc is indicated by VSNc.

The TP arm 105TP is formed by serially connecting a bidirectional chopper group 106TPc which includes M bidirectional chopper type unit converters 108 connected in series to a full bridge group 106TPf which includes N full bridge type unit converters 109 connected in series. An output voltage of the bidirectional chopper group 106TPc is indicated by VTPc, and an output voltage of the full bridge group 106TPf is indicated by VTPf.

The TN arm 105TN is formed by serially connecting a full bridge group 106TNf which includes N full bridge type unit converters 109 connected in series to a bidirectional chopper group 106TNc which includes M bidirectional chopper type unit converters 108 connected in series. An output voltage of the full bridge group 106TNf is indicated by VTNf, and an output voltage of the bidirectional chopper group 106TNc is indicated by VTNc.

The respective arms 105RP, 105SP, 105TP, 105RN, 105SN and 105TN include the current sensors 111 which detect currents IRP, ISP, ITP, IRN, ISN and ITN flowing through the arms, and transmit detection results to the controller 112.

Hereinafter, an internal configuration of the bidirectional chopper type unit converter 108 will be described with reference to FIG. 2.

A main circuit of the bidirectional chopper type unit converter 108 has a configuration in which a circuit where a parallel circuit of a switching element (high side switching element) 201H and a free wheel diode (high side free wheel diode) 202H and a parallel circuit of a switching element (low side switching element) 201L and a free wheel diode (low side free wheel diode) 202L are connected in series and a capacitor 203 are connected in parallel.

An applied voltage Vjk (where j=RP, SP, TP, RN, SN, and TN, and k=1, 2, . . . , and M) to the parallel circuit of the switching element (low side switching element) 201L and the free wheel diode (low side free wheel diode) 202L is referred to as an output voltage of the bidirectional chopper type unit converter 108.

Figure 2:
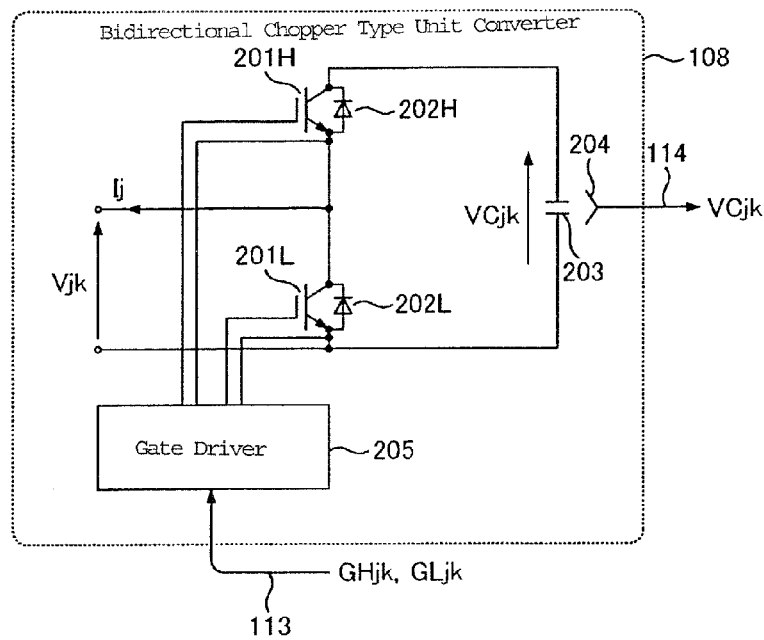
FIG. 2 is a diagram illustrating a bidirectionalbidirectional chopper type unit converter.

In addition, in FIG. 2, although the symbol for IGBT is used in the switching elements 201H and 201L, MOSFET, GCT, GTO, and other self-commutated elements may be used as the switching elements 201H and 201L.

The bidirectional chopper type unit converter 108 includes a voltage sensor 204 which detects a capacitor voltage VCjk and is connected to the controller 112 via the capacitor voltage detection line 114.

In addition, the bidirectional chopper type unit converter 108 includes a gate driver 205 which applies a gate voltage between the gate and the emitter of each of the switching elements 201H and 201L on the basis of gate signals GHjk and GLjk transmitted from the controller 112 via the gate signal line 113.

A description will now be made of a relationship between an output voltage Vjk of the bidirectional chopper type unit converter 108 and turning-on and turning-off of the switching elements 201H and 201L.

When the switching element (high side switching element) 201H is turned on, and the switching element (low side switching element) 201L is turned off, the output voltage Vjk can be controlled so as to be substantially the same as the capacitor voltage VCjk regardless of a current Ij (where j=RP, SP, TP, RN, SN, and TN).

When the switching element (high side switching element) 201H is turned off, and the switching element (low side switching element) 201L is turned on, the output voltage Vjk can be controlled so as to be substantially the same as zero regardless of a current Ij.

As above, the bidirectional chopper type unit converter 108 is a unit converter which can output a zero voltage or a unipolar voltage such as VCjk.

Figure 3:
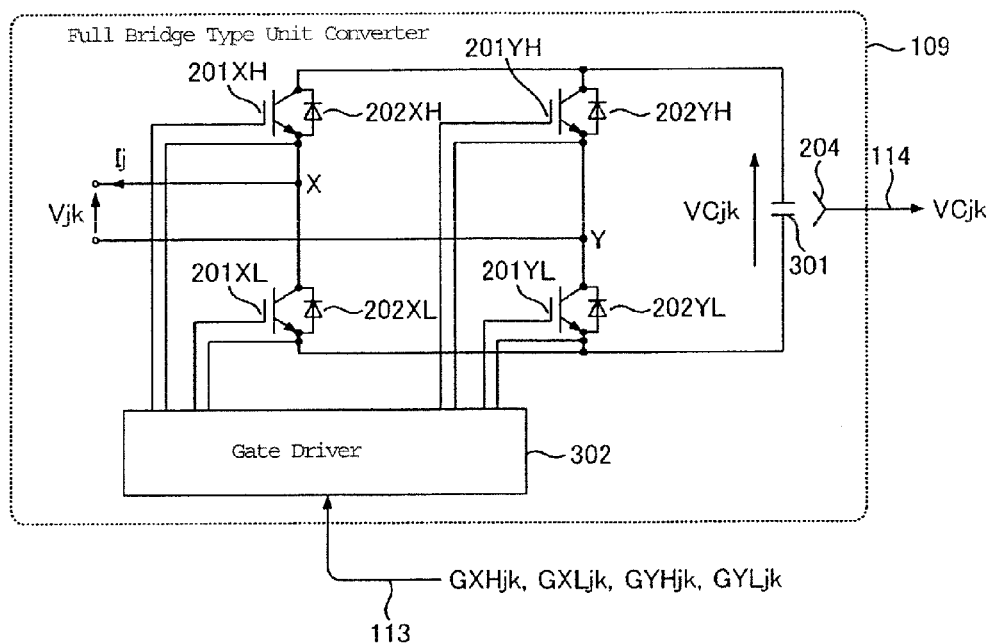
FIG. 3 is a diagram illustrating a full bridge type unit converter.

Hereinafter, an internal configuration of the full bridge type unit converter 109 will be described with reference to FIG. 3.

A main circuit of the full bridge type unit converter 109 has a configuration in which a circuit where a parallel circuit of a switching element (X phase high side switching element) 201XH and a free wheel diode (X phase high side free wheel diode) 202XH and a parallel circuit of a switching element (X phase low side switching element) 201XL and a free wheel diode (X phase low side free wheel diode) 202XL are connected in series, a circuit where a parallel circuit of a switching element (Y phase high side switching element) 201YH and a free wheel diode (Y phase high side free wheel diode) 202YH and a parallel circuit of a switching element (Y phase low side switching element) 201YL and a free wheel diode (Y phase low side free wheel diode) 202YL are connected in series, and a capacitor 301 are connected in parallel.

Here, a serial connection point between the parallel circuit of the switching element (X phase high side switching element) 201XH and the free wheel diode (X phase high side free wheel diode) 202XH and the parallel circuit of the switching element (X phase low side switching element) 201XL and the free wheel diode (X phase low side free wheel diode) 202XL is referred to as an X point.

In addition, a serial connection point between the parallel circuit of a switching element (Y phase high side switching element) 201YH and the free wheel diode (Y phase high side free wheel diode) 202YH and the parallel circuit of the switching element (Y phase low side switching element) 201YL and the free wheel diode (Y phase low side free wheel diode) 202YL is referred to as a Y point.

A potential Vjk of the X point with respect to the Y point is referred to as an output voltage of the full bridge type unit converter 109.

The full bridge type unit converter 109 includes a voltage sensor 204 which detects a capacitor voltage VCjk (where j=RP, SP, TP, RN, SN, and TN, and k=M+1, M+2, . . . , and M+N) and is connected to the controller 112 via the capacitor voltage detection line 114.

In addition, the full bridge type unit converter 109 includes a gate driver 302 which applies a gate voltage between the gate and the emitter of each of the switching elements 201XH, 201XL, 201YH and 201YL on the basis of gate signals GXHjk, GXLjk, GYHjk and GYLjk transmitted from the controller 112 via the gate signal line 113.

A description will now be made of a relationship between an output voltage Vjk of the full bridge type unit converter 109 and turning-on and turning-off of the switching elements 201XH, 201XL, 201YH and 201YL.

When the switching element (X phase high side switching element) 201XH is turned on, the switching element (X phase low side switching element) 201XL is turned off, the switching element (Y phase high side switching element) 201YH is turned on, and the switching element (Y phase low side switching element) 201YL is turned off, the output voltage Vjk can be controlled so as to be substantially the same as zero regardless of a current Ij.

When the switching element (X phase high side switching element) 201XH is turned on, the switching element (X phase low side switching element) 201XL is turned off, the switching element (Y phase high side switching element) 201YH is turned off, and the switching element (Y phase low side switching element) 201YL is turned on, the output voltage Vjk can be controlled so as to be substantially the same as the capacitor voltage VCjk regardless of a current Ij.

When the switching element (X phase high side switching element) 201XH is turned off, the switching element (X phase low side switching element) 201XL is turned on, the switching element (Y phase high side switching element) 201YH is turned on, and the switching element (Y phase low side switching element) 201YL is turned off, the output voltage Vjk can be controlled so as to be substantially the same as a negative polarity voltage –VCjk of the capacitor voltage VCjk regardless of a current Ij.

When the switching element (X phase high side switching element) 201XH is turned off, the switching element (X phase low side switching element) 201XL is turned on, the switching element (Y phase high side switching element) 201YH is turned off, and the switching element (Y phase low side switching element) 201YL is turned on, the output voltage Vjk can be controlled so as to be substantially the same as zero regardless of a current Ij.

As above, the full bridge type unit converter 109 is a unit converter which can output bipolar voltages such as VCjk, 0, and –VCjk.

Hereinafter, a control method performed by the controller 112 will be described with reference to FIGS. 4 and 5. In addition, in the present embodiment, the description will be made assuming a case where a turn ratio of the transformer 103 is 1:1.

Figure 4:
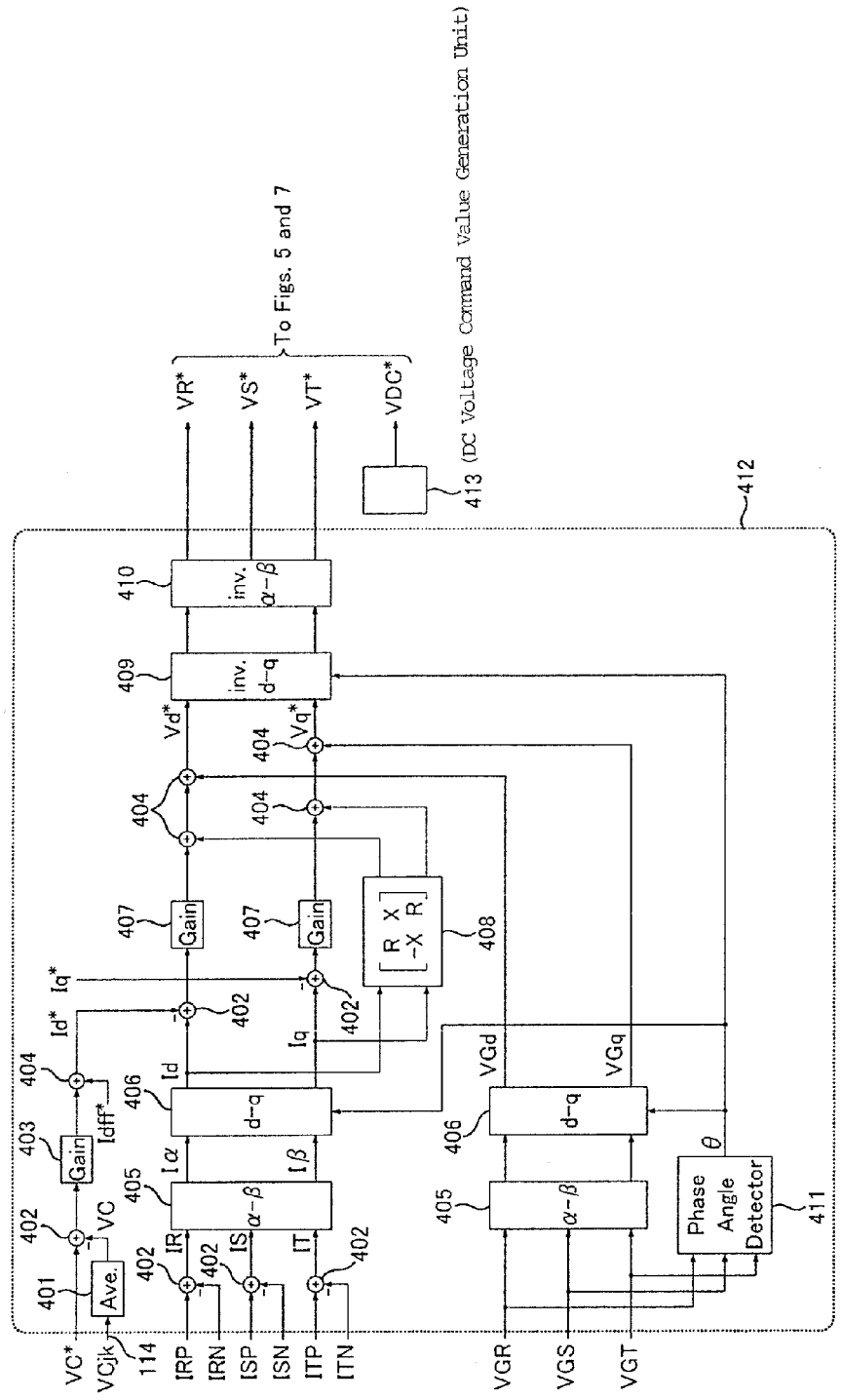
FIG. 4 is a diagram illustrating an AC voltage command value generation unit and a DC voltage command value generation unit.

FIG. 4 shows an AC voltage command value generation unit 412 which generates an AC voltage command value given to the power conversion device 102 and a DC voltage command value generation unit 413 which generates a DC voltage command value given thereto. In addition, FIG. 5 shows a command value distribution unit 504 which distributes a DC voltage command value and an AC voltage command value obtained in FIG. 4 to the respective unit converters 108 and 109, and a DC fault detection unit 505 which detects a DC fault. First, an operation of the respective units shown in FIG. 4 will be described.

The respective units shown in FIG. 4 have a capacitor voltage control function of controlling an average value of capacitor voltages of the overall unit converters 108 and 109 so as to be constant, a current control function of controlling a d-axis current Id and a q-axis current Iq flowing through the AC system (power system) 101, and a function of generating an AC voltage command value and a DC voltage command value for realizing the two control functions.

The capacitor voltage control function will now be described.

An average value of capacitor voltages VCjk of the overall unit converters, detected by voltage sensors 204 via the capacitor voltage detection lines 114, is calculated. A difference VC*−VC between a capacitor voltage average value VC and a capacitor voltage command value VC* is multiplied by a capacitor voltage control gain 403, and a d-axis current command value Id* is obtained by further adding a d-axis current feed forward Idff* thereto. In addition, Idff* indicates a d-axis current command value for controlling active power which is supplied from the AC system 101 to the DC device 117 via the power conversion device 102.

In the description of the present embodiment, the d axis and q axis are set such that, in a case where the d-axis current is positive, active power flows into the power conversion device 102 from the AC system 101, and in a case where the d-axis current is negative, active power flows out of the power conversion device 102 to the AC system 101.

When the capacitor voltage average value VC is smaller than the command value VC*, active power flows from the AC system and thus the capacitor voltage average value VC increases. Conversely, when the capacitor voltage average value VC is greater than the command value VC*, active power flows to the AC system and thus the capacitor voltage decreases. By this operation, it is possible to perform control such that the capacitor voltage average value VC conforms to the command value VC*.

The current control function will now be described.

A difference IRP−IRN between a current IRP flowing through the RP arm 105RP and a current IRN flowing through the RN arm 105RN, detected using the current sensors 111, that is, a current IR flowing through the AC system 101 is calculated. In addition, a current sensor for detecting IR may be provided separately.

A difference ISP−ISN between a current ISP flowing through the SP arm 105SP and a current ISN flowing through the SN arm 105SN, detected using the current sensors 111, that is, a current IS flowing through the AC system 101 is calculated. In addition, a current sensor for detecting IS may be provided separately.

A difference ITP−ITN between a current ITP flowing through the TP arm 105TP and a current ITN flowing through the TN arm 105TN, detected using the current sensors 111, that is, a current IT flowing through the AC system 101 is calculated. In addition, a current sensor for detecting IT may be provided separately.

The detected IR, IS and IT undergo α-β transform and d-q transform, thereby obtaining a d-axis current Id and a q-axis current Iq. Here, a phase angle θ used for the d-q transform is a phase angle which is detected by a phase detector 411 from voltages VGR, VGS and VGT of the AC system 101 and is synchronized with a phase of VGR.

A d-axis voltage command value Vd* and a q-axis voltage command value Vq* given to the power conversion device 102 are calculated based on Expressions (1) and (2) such that the d-axis current detection value Id conforms to a d-axis current command value Id*, and the q-axis current detection value Iq conforms to a q-axis current command value Iq*.

$$Vd^* = VGd + \text{Gain}(Id^* - Id) + R \cdot Id + X \cdot Iq \quad (1)$$

$$Vq^* = VGq + \text{Gain}(Iq^* - Iq) - X \cdot Id + R \cdot Iq \quad (2)$$

Here, VGd and VGq in Expressions (1) and (2) respectively indicate an AC system d-axis voltage and an AC system q-axis voltage obtained by performing the α-β transform and the d-q transform for the voltages VGR, VGS and VGT of the AC system 101.

In addition, it is appropriate that R in Expressions (1) and (2) is set to a sum of coil resistance of the transformer 103 and ½ of coil resistance of the reactor 107, and X is set to a sum of leakage reactance of the transformer 103 and ½ of reactance of the reactor 107.

The AC voltage command value generation unit 412 performs inverse d-q transform and inverse α-β transform for Vd* and Vq* obtained using Expressions (1) and (2), thereby calculating AC voltage command values VR*, VS* and VT*.

The DC voltage command value generation unit 413 generates a DC voltage command value VDC*.

An operation of the command value distribution unit 504 will now be described with reference to FIG. 5.

As shown in Expressions (3) to (6), the R phase AC voltage command value VR* and the DC voltage command value VDC* are distributed to an output voltage command value VRPc* of the bidirectional chopper group 106RPc, an output voltage command value VRPf* of the full bridge group 106RPf, an output voltage command value VRNc* of the bidirectional chopper group 106RNc, and an output voltage command value VRNf* of the full bridge group 106RNf.

$$VRPc^* = -(m/(m+n))D^2 \cdot VR^* + (m/(m+n))D \cdot VDC^*/2 \quad (3)$$

$$VRPf^* = -(1-(m/(m+n))D^2)VR^* + (n/(m+n))D \cdot VDC^*/2 \quad (4)$$

$$VRNc^* = (m/(m+n))D^2 \cdot VR^* + (m/(m+n))D \cdot VDC^*/2 \quad (5)$$

$$VRNf^* = (1-(m/(m+n))D^2)VR^* + (n/(m+n))D \cdot VDC^*/2 \quad (6)$$

Here, m and n are numbers which satisfy m:n=(the maximum output voltages of the bidirectional chopper groups 106RPc and 106RNc):(the maximum output voltages of the full bridge groups 106RPf and 106RNf).

In order to suppress a fault current when a DC fault described later occurs, m≤n is appropriate.

In addition, D indicates a DC fault detection signal which is output by the DC fault detection unit 505 described later, and the signal becomes 1 when a DC fault is not detected and becomes 0 when a DC fault is detected.

Similarly, as shown in Expressions (7) to (10), the S phase AC voltage command value VS* and the DC voltage command value VDC* are distributed to an output voltage command value VSPc* of the bidirectional chopper group 106SPc, an output voltage command value VSPf* of the full bridge group 106SPf, an output voltage command value VSNc* of the bidirectional chopper group 106SNc, and an output voltage command value VSNf* of the full bridge group 106SNf.

$$VSPc^* = -(m/(m+n))D^2 \cdot VS^* + (m/(m+n))D \cdot VDC^*/2 \quad (7)$$

$$VSPf^* = -(1-(m/(m+n))D^2)VS^* + (n/(m+n))D \cdot VDC^*/2 \quad (8)$$

$$VSNc^* = (m/(m+n))D^2 \cdot VS^* + (m/(m+n))D \cdot VDC^*/2 \quad (9)$$

$$VSNf^* = (1-(m/(m+n))D^2)VS^* + (n/(m+n))D \cdot VDC^*/2 \quad (10)$$

Here, m, n, and D are the same numbers as described above.

Similarly, as shown in Expressions (11) to (14), the T phase AC voltage command value VT* and the DC voltage command value VDC* are distributed to an output voltage command value VTPc* of the bidirectional chopper group 106TPc, an output voltage command value VTPf* of the full bridge group 106TPf, an output voltage command value VTNc* of the bidirectional chopper group 106TNc, and an output voltage command value VTNf* of the full bridge group 106TNf.

$$VTPc^* = -(m/(m+n))D^2 \cdot VT^* + (m/(m+n))D \cdot VDC^*/2 \quad (11)$$

$$VTPf^* = -(1-(m/(m+n))D^2)VT^* + (n/(m+n))D \cdot VDC^*/2 \quad (12)$$

$$VTNc^* = (m/(m+n))D^2 \cdot VT^* + (m/(m+n))D \cdot VDC^*/2 \quad (13)$$

$$VTNf^* = (1-(m/(m+n))D^2)VT^* + (n/(m+n))D \cdot VDC^*/2 \quad (14)$$

Here, m, n, and D are the same numbers as described above.

Although the first term in Expressions (3) to (14) includes $D^2$, and the second term includes D, it is possible to achieve the same effect even by using $D^a$ and $D^b$ (where a and b are any positive real numbers) instead of $D^2$ and D. In the following, a description will be made assuming a=2 and b=1, as in Expressions (3) to (14).

In addition, in a case where, in the respective arms 105RP, 105SP, 105TP, 105RN, 105SN and 105TN, the bidirectional chopper type unit converter 108 or the full bridge type unit converter 109 fails, the failed unit converter is short-circuited.

In a case where the failed unit converter is short-circuited, a ratio of a sum of the maximum output voltages of the bidirectional chopper type unit converters 108 in the arm 105 including the failed unit converter and a sum of the maximum output voltages of the full bridge type unit converters 109, that is, m:n varies.

In order to handle this case, the command value distribution unit 504 and a command value distribution unit 701 of FIG. 7 described later may have a function of performing control such that the power conversion device 102 is continuously operated, by varying m and n described in Expressions (3) to (14) so as to vary a distribution ratio of the voltage command values, with respect to the arm 105 including the failed unit converter.

For example, when any one of the bidirectional chopper type unit converters 108 fails and is thus short-circuited, in an arm including the corresponding bidirectional chopper type unit converter 108, m:n is varied to (m−Δm):n, thereby continuously operating the arm. Here, Δm is a ratio of the maximum output voltage of a single bidirectional chopper type unit converter 108 and a total of the maximum output voltages of M bidirectional chopper type unit converters 108 including the failed unit converter in the arm including the failed bidirectional chopper type unit converter 108.

In addition, for example, when any one of the full bridge type unit converters 109 fails and is thus short-circuited, in an arm including the corresponding full bridge type unit converter 109, m:n is varied to m:(n−Δn), thereby continuously operating the arm. Here, Δn is a ratio of the maximum output voltage of a single full bridge type unit converter 109 and a total of the maximum output voltages of N full bridge type unit converters 109 including the failed unit converter in the arm including the failed full bridge type unit converter 109.

Next, an operation of a gate pulse generation unit 503 will be described.

The gate pulse generation unit 503 generates gate signals GHRPk and GLRPk which are given to each bidirectional chopper type unit converter 108 in order to control output voltages VRPk (where k=1, 2, . . . , and M) of the M bidirectional chopper type unit converters 108 included in the bidirectional chopper group 106RPc such that each voltage command value VRPc* obtained using Expression (3) conforms to a practical VRPc to the utmost.

Similarly, the gate pulse generation unit 503 generates gate signals GXHRPk, GXLRPk, GYHRPk and GYLRPk which are given to each full bridge type unit converter 109 in order to control output voltages VRPk (where k=M+1, M+2, . . . , and N) of the N full bridge type unit converters 109 included in the full bridge group 106RPf such that each voltage command value VRPf* obtained using Expression (4) conforms to a practical VRPf to the utmost.

The gate pulse generation unit 503 generates gate signals GHRNk and GLRNk which are given to each bidirectional chopper type unit converter 108 in order to control output voltages VRNk (where k=1, 2, . . . , and M) of the M bidirectional chopper type unit converters 108 included in the bidirectional chopper group 106RNc such that each voltage command value VRNc* obtained using Expression (5) conforms to a practical VRNc to the utmost.

Similarly, the gate pulse generation unit 503 generates gate signals GXHRNk, GXLRNk, GYHRNk and GYLRNk which are given to each full bridge type unit converter 109 in order to control output voltages VRNk (where k=M+1, M+2, . . . , and N) of the N full bridge type unit converters 109 included in the full bridge group 106RNf such that each voltage command value VRNf* obtained using Expression (6) conforms to a practical VRNf to the utmost.

The gate pulse generation unit 503 generates gate signals GHSPk and GLSPk which are given to each bidirectional chopper type unit converter 108 in order to control output voltages VSPk (where k=1, 2, . . . , and M) of the M bidirectional chopper type unit converters 108 included in the bidirectional chopper group 106SPc such that each voltage command value VSPc* obtained using Expression (7) conforms to a practical VSPc to the utmost.

Similarly, the gate pulse generation unit 503 generates gate signals GXHSPk, GXLSPk, GYHSPk and GYLSPk which are given to each full bridge type unit converter 109 in order to control output voltages VSPk (where k=M+1, M+2, . . . , and N) of the N full bridge type unit converters 109 included in the full bridge group 106SPf such that each voltage command value VSPf* obtained using Expression (8) conforms to a practical VSPf to the utmost.

The gate pulse generation unit 503 generates gate signals GHSNk and GLSNk which are given to each bidirectional chopper type unit converter 108 in order to control output voltages VSNk (where k=1, 2, . . . , and M) of the M bidirectional chopper type unit converters 108 included in the bidirectional chopper group 106SNc such that each voltage command value VSNc* obtained using Expression (9) conforms to a practical VSNc to the utmost.

Similarly, the gate pulse generation unit 503 generates gate signals GXHSNk, GXLSNk, GYHSNk and GYLSNk which are given to each full bridge type unit converter 109 in order to control output voltages VSNk (where k=M+1, M+2, . . . , and N) of the N full bridge type unit converters 109 included in the full bridge group 106SNf such that each voltage command value VSNf* obtained using Expression (10) conforms to a practical VSNf to the utmost.

The gate pulse generation unit 503 generates gate signals GHTPk and GLTPk which are given to each bidirectional chopper type unit converter 108 in order to control output voltages VTPk (where k=1, 2, . . . , and M) of the M bidirectional chopper type unit converters 108 included in the bidirectional chopper group 106TPc such that each voltage command value VTPc* obtained using Expression (11) conforms to a practical VTPc to the utmost.

Similarly, the gate pulse generation unit 503 generates gate signals GXHTPk, GXLTPk, GYHTPk and GYLTPk which are given to each full bridge type unit converter 109 in order to control output voltages VTPk (where k=M+1, M+2, . . . , and N) of the N full bridge type unit converters 109 included in the full bridge group 106TPf such that each voltage command value VTPf* obtained using Expression (12) conforms to a practical VTPf to the utmost.

The gate pulse generation unit 503 generates gate signals GHTNk and GLTNk which are given to each bidirectional chopper type unit converter 108 in order to control output voltages VTNk (where k=1, 2, . . . , and M) of the M bidirectional chopper type unit converters 108 included in the bidirectional chopper group 106TNc such that each voltage command value VTNc* obtained using Expression (13) conforms to a practical VTNc to the utmost.

Similarly, the gate pulse generation unit 503 generates gate signals GXHTNk, GXLTNk, GYHTNk and GYLTNk which are given to each full bridge type unit converter 109 in order to control output voltages VTNk (where k=M+1, M+2, . . . , and N) of the N full bridge type unit converters 109 included in the full bridge group 106TNf such that each voltage command value VTNf* obtained using Expression (14) conforms to a practical VTNf to the utmost.

Next, an operation of the DC fault detection unit 505 will be described.

The DC fault detection unit receives the DC system voltage VDC, the DC system current IDC, and the external signal DCF.

In a case where VDC is smaller than a value which is set in advance or sequentially, IDC is greater than a value which is set in advance or sequentially, or a predefined signal is received as the external signal DCF, a DC fault is detected, and the DC fault detection signal D is output. As described above, D is a signal which becomes 1 when a DC fault is not detected and becomes 0 when a DC fault is detected. In addition, a value between 0 and 1 may be used.

Figure 6:
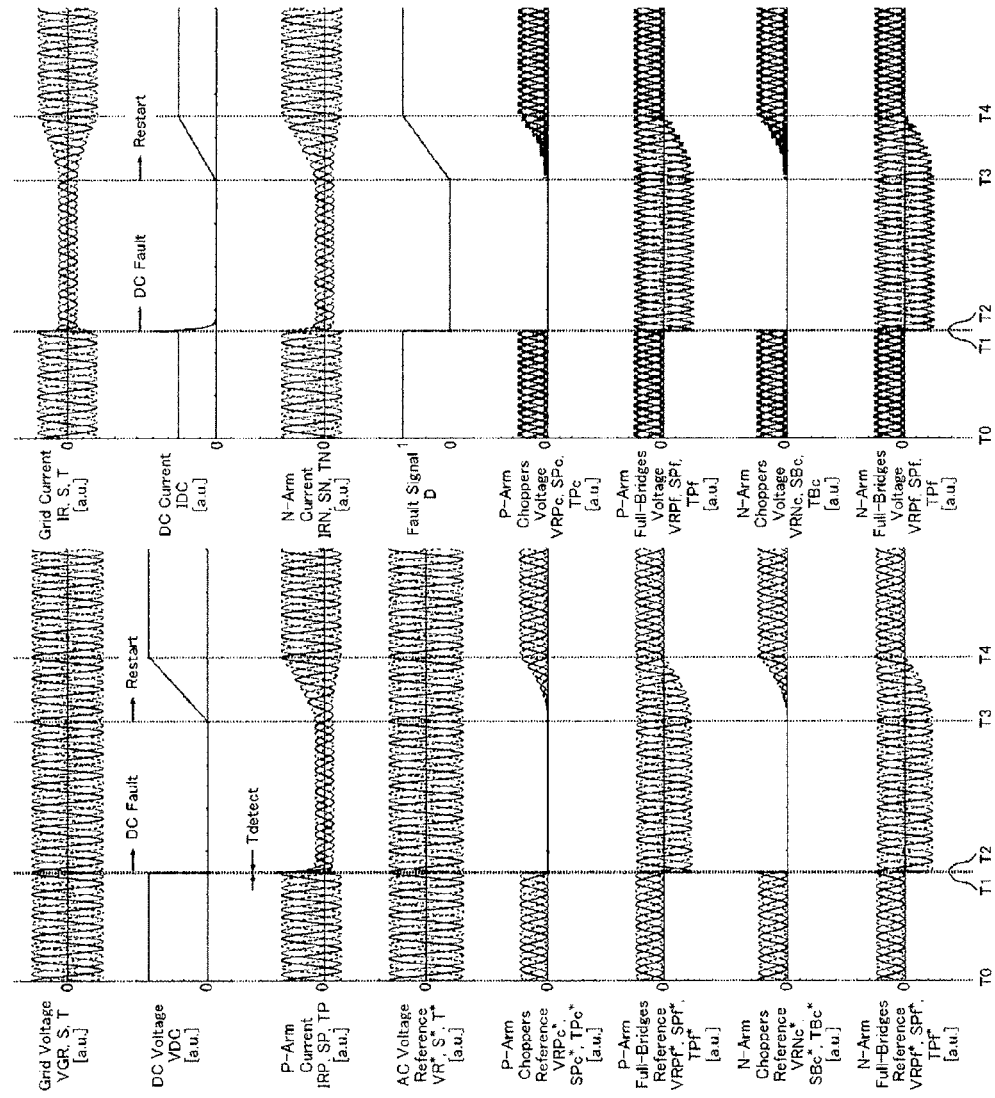
FIG. 6 is a diagram illustrating schematic operation waveforms according to the first embodiment.

In addition, after a specific time has elapsed from the detection of the DC fault, or in a case where a predefined signal is received as the external signal DCF, the DC fault detection unit 505 returns the DC fault detection signal D to 1 from 0. At this time, the DC fault detection unit 505 varies D from 0 to 1 instantaneously or with a certain slope. In FIG. 6 described later, a description will be made assuming that D is varied from 0 to 1 with a certain slope.

The DC fault detection signal D may be given to the above-described command value distribution unit 504.

As above, the configuration and the control method of the power conversion device 102 have been described.

Hereinafter, with reference to FIG. 6, a description will be made of schematic operation waveforms in a case where the DC fault 118 occurs between the power conversion device 102 and the DC device 117 during an operation of the power conversion device 102. In addition, in the description of the waveforms, effects of the present embodiment and a mechanism thereof will be described.

FIG. 6 shows schematic waveforms of the AC system voltages VGR, VGS and VGT, the AC system currents IR, IS and IT, the DC system voltage VDC, the DC system current IDC, the currents IRP, ISP and ITP flowing through the arms 105RP, 105SP and 105TP, the currents IRN, ISN and ITN flowing through the arms 105RN, 105SN and 105TN, the AC voltage command values VR*, VS* and VT*, the DC fault detection signal D, voltage command values VRPc*, VSPc* and VTPc* given to the bidirectional chopper groups 106RPc, 106SPc and 106TPc, the output voltages VRPc, VSPc and VTPc of the bidirectional chopper groups 106RPc, 106SPc and 106TPc, the voltage command values VRPf*, VSPf* and VTPf* given to the full bridge groups 106RPf, 106SPf and 106TPf, the output voltages VRPf, VSPf and VTPf of the full bridge groups 106RPf, 106SPf and 106TP, the voltage command values VRNc*, VSNc* and VTNc* given to the bidirectional chopper groups 106RNc, 106SNc and 106TNc, the output voltages VRNc, VSNc and VTNc of the bidirectional chopper groups 106RNc, 106SNc and 106TNc, the voltage command values VRNf*, VSNf* and VTNf* given to the full bridge groups 106RNf, 106SNf and 106TNf, and the output voltages VRNf, VSNf and VTNf of the full bridge groups 106RNf, 106SNf and 106TNf.

Further, in FIG. 6, [a.u.] indicates an arbitrary unit.

In addition, FIG. 6 exemplifies waveforms in a case where a ratio of the maximum output voltage of the bidirectional chopper type unit converter 108 and the maximum output voltage of the full bridge type unit converter 109 included in a single arm 105, that is, m:n is 1:1.

During the time period between the time points T0 and T1, the d-axis and q-axis current command values Id* and Iq* have finite values, and the power conversion device 102 receives active power P and reactive power Q from the AC system 101. In addition, power which is substantially the same as the received active power P is supplied to the DC device 117.

The DC fault 118 occurs at the time point T1. If the DC fault 118 occurs at a location directly adjacent to the power conversion device 102, VDC becomes zero.

If VDC becomes zero, the overall DC voltages generated by the respective unit converters 108 and 109 of the legs 104R, 104S and 104T are applied to the reactors 107RP, 107RN, 107SP, 107SN, 107TP and 107TN. For this reason, the DC system current IDC increases.

From the above description, the DC fault can be detected from the decrease in the DC system voltage VDC or the increase in the DC system current IDC.

At the time point T2, the DC fault detection unit 505 detects the DC fault, and varies the DC fault detection signal D from 1 to 0. Depending on the variation in D, the command value distribution unit 504 varies voltage command values given to the respective unit converters 108 and 109.

Specifically, the output voltage command values VRPc*, VSPc*, VTPc*, VRN*, VSN* and VTN* of the bidirectional chopper groups 106RPc, 106SPc, 106TPc, 106RNc, 106SNc and 106TNc are varied to zero, DC components of the output voltage command values VRPf*, VSPf*, VTPf*, VRN*, VSN* and VTN* of the full bridge groups 106RPf, 106SPf, 106TPf, 106RNf, 106SNf and 106TNf are varied to zero, and AC components are varied doubly. Here, the reason why the AC components are varied doubly is that m:n=1:1.

In addition, in a case where the DC system voltage VDC becomes zero due to the DC fault, since power cannot be supplied to the DC device 117 even if the DC current IDC is made to flow, the power conversion device 102 makes the d-axis current feed forward value Idff* for controlling active power received from the AC system 101 become zero at the time point T2. The currents IR, IS and IT flowing through the AC system substantially include only reactive current components corresponding to q-axis currents during the time period between the time points T2 and T3.

In other words, in the present embodiment, the power conversion device 102 can maintain the function of supplying reactive power to the AC system 101 even in the circumstances where the DC fault occurs. In FIG. 6, although a case where the q-axis current command value is controlled so as to be constant before and after the DC fault occurs, that is, constant reactive power is supplied has been exemplified, for example, when active power of the AC system 101 side rapidly varies due to a DC fault, there is a probability that power of the AC system 101 may fluctuate. In this case, it is possible to perform control so as to suppress power of the AC system 101 from fluctuating by using reactive power which is supplied to the AC system by the power conversion device 102.

Here, the effects achieved by the present embodiment and a mechanism thereof will be described.

During the time period between the time points T2 and T3, the DC system voltage VDC is zero, but DC components of output voltages of the respective bidirectional chopper type unit converters 108 and full bridge type unit converters 109 are also substantially zero, and thus it is possible to prevent the DC system current IDC from being overcurrent.

In addition, since the full bridge groups 106RPf, 106SPf, 106TPf, 106RNf, 106SNf and 106TNf output voltages resisting against the voltages VGR, VGS and VGT of the AC system 101, it is also possible to prevent a current from flowing into the DC fault 118 from the AC system 101.

Therefore, according to the circuit configuration described with reference to FIG. 1, and the control method described with reference to FIGS. 4 and 5 in the present embodiment, it is possible to achieve an effect of preventing overcurrent flowing when a DC fault occurs.

In R. S. Whitehouse, "Technical Challenges of realizing multi-terminal networking with VSC", EPE 2011, the overall unit converters are full bridge type unit converters, but, in the present invention, the bidirectional chopper type unit converter 108 and the full bridge type unit converter 109 are mixed, and thereby it is possible to reduce the number of the switching elements 201.

For example, in a case where all the switching elements 201 have the same rating, and m:n is 1:1, it is possible to achieve an effect that the number of the switching elements 201 can be reduced to ¾.

Meanwhile, after the DC fault 118 is removed at anytime point of the time period between the time points T2 and T3, the DC fault detection unit 505 gradually returns the DC fault detection signal D to 1 from 0 during the time period between the time points T3 and T4.

Depending on the variation in D, the command value distribution unit 504 returns the output voltage command values VRPc*, VSPc*, VTPc*, VRNc*, VSNc* and VTNc* of the bidirectional chopper groups 106RPc, 106SPc, 106TPc, 106RNc, 106SNc and 106TNc, and the output voltage command values VRPf*, VSPf*, VTPf*, VRNf*, VSNf* and VTNf* of the full bridge groups 106RPf, 106SPf, 106TPf, 106RNf, 106SNf and 106TNf, to the waveforms before the DC fault occurs, that is, the same waveforms as those during the time period between the time points T0 and T1.

In addition, the d-axis current feed forward Idff* is returned to the same waveform as that during the time period between the time point T0 and T1, and thus the currents IR, IS and IT flowing through the AC system are also returned to the same waveforms as those during the time period between the time points T0 and T1.

As above, the schematic operation waveforms according to the present embodiment have been described with reference to FIG. 6.

Figure 9:
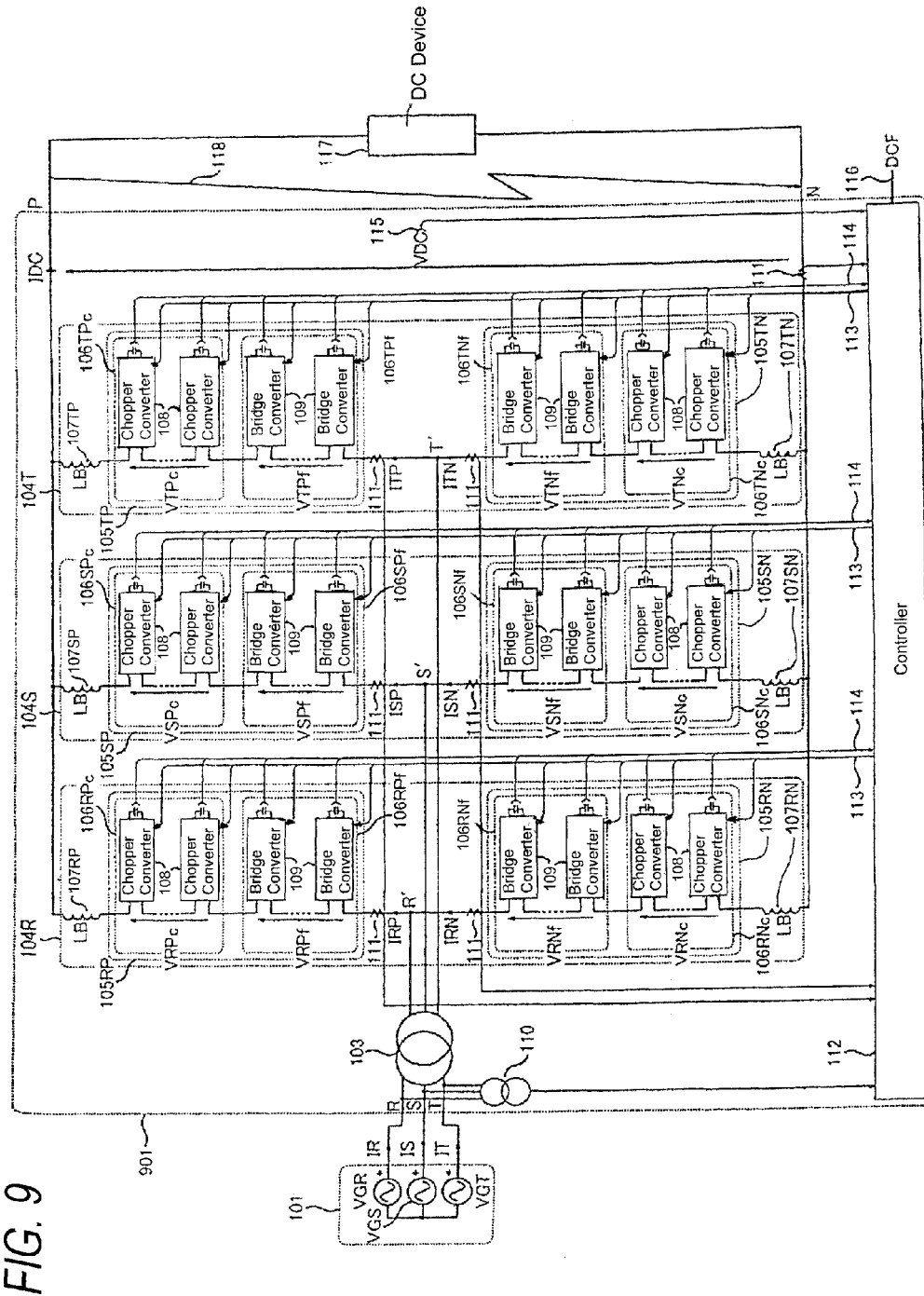
FIG. 9 is a diagram illustrating a power conversion device where a connection position of the reactor is changed.

In addition, although, in the present embodiment, as shown in FIG. 1, the circuit where the reactors 107RP, 107SP, 107TP, 107RN, 107SN and 107TN are connected to the secondary windings of the transformer 103, that is, the R' point, the S' point, and the T' point has been exemplified, for example, as shown in FIG. 9, the same effects can be achieved even in a circuit where the reactors 107RP, 107SP and 107TP are connected to the P point, and the reactors 107RN, 107SN and 107TN are connected to the N point.

In addition, although not shown, the same effects can be achieved regardless of the serial connection order of the reactor 107RP, the bidirectional chopper group 106RPc, and the full bridge group 106RPf in the R phase leg 104R. Further, although not shown, the same effects can be achieved regardless of the serial connection order of the reactor 107RN, the bidirectional chopper group 106RNc, and the full bridge group 106RNf in the R phase leg 104R.

In addition, although not shown, the same effects can be achieved regardless of the serial connection order of the reactor 107SP, the bidirectional chopper group 106SPc, and the full bridge group 106 SPf in the S phase leg 104S. Further, although not shown, the same effects can be achieved regardless of the serial connection order of the reactor 107SN, the bidirectional chopper group 106SNc, and the full bridge group 106SNf in the S phase leg 104S.

In addition, although not shown, the same effects can be achieved regardless of the serial connection order of the reactor 107TP, the bidirectional chopper group 106TPc, and the full bridge group 106TPf in the T phase leg 104T. Further, although not shown, the same effects can be achieved regardless of the serial connection order of the reactor 107TN, the bidirectional chopper group 106TNc, and the full bridge group 106TNf in the T phase leg 104T.

In addition, although FIGS. 1 and 9 exemplify the circuit diagrams where the bidirectional chopper type unit converters 108 are concentrated in the bidirectional chopper groups 106RPc, 106SPc, 106TPc, 106RNc, 106SNc and 106TNc, and the full bridge type unit converters 109 are concentrated in the full bridge groups 106RPf, 106SPf, 106TPf, 106RNf, 106SNf and 106TNf, for example, even if the bidirectional chopper type unit converters 108 and the full bridge type unit converters 109 are alternately connected in series, or, for example, even if the bidirectional chopper type unit converters 108 and the full bridge type unit converters 109 are randomly connected in series, the same effects can be achieved.

Figure 5:
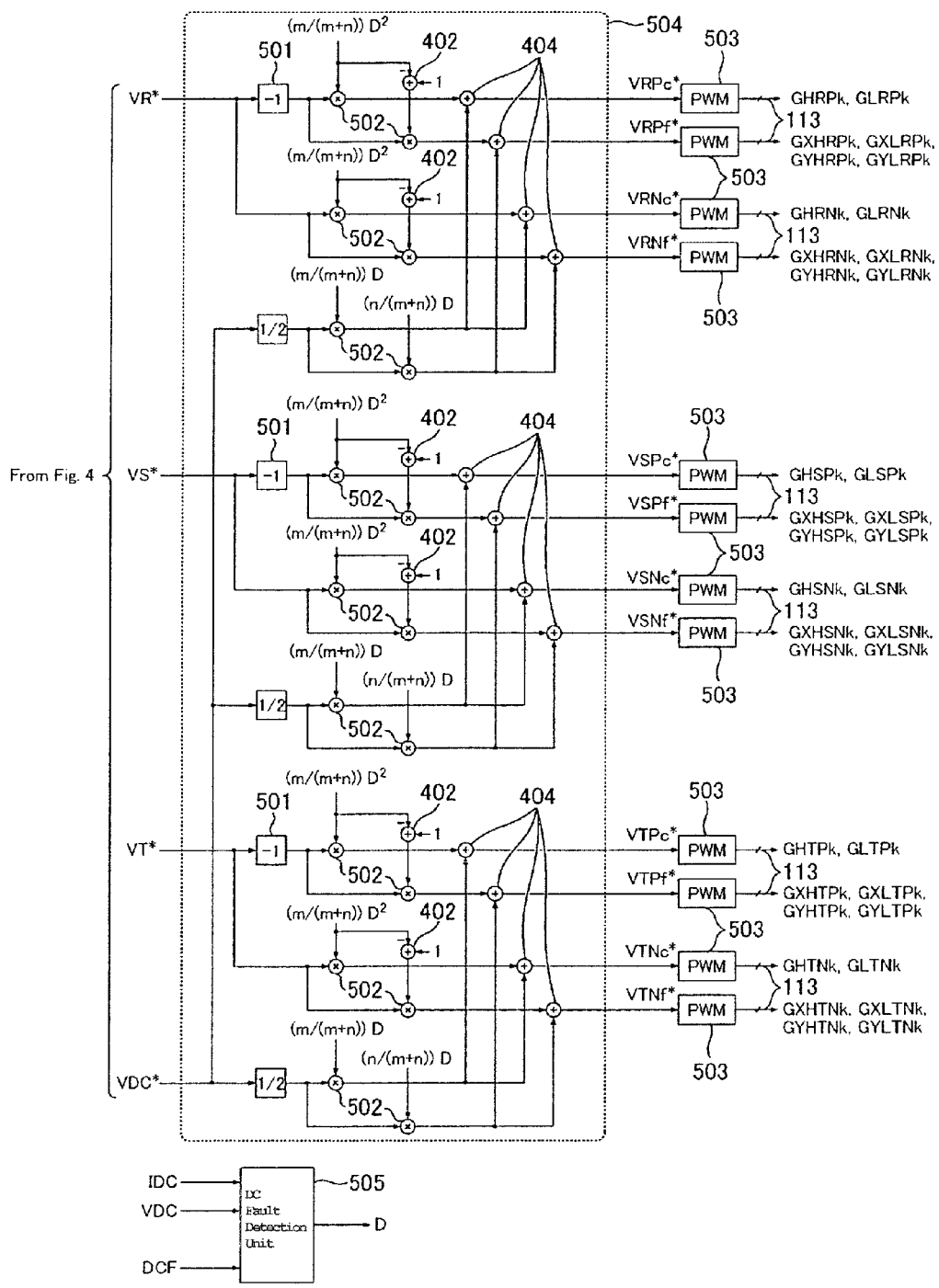
FIG. 5 is a diagram illustrating a command value distribution unit and a DC fault detection unit according to the first embodiment.

Further, although, in the above description, a case where the ratio m:n of a sum of the maximum output voltages of the bidirectional chopper type unit converters 108 and a sum of the maximum output voltages of the full bridge type unit converters 109, included in the respective legs 104R, 104S and 104T is the same in the whole legs has been described, even in a case where m:n is different for each leg, the effects described in the present embodiment can be achieved by replacing the control method of the command value distribution unit 504 shown in FIG. 5 with a method described below.

In addition, as described later, there may be a configuration in which a certain leg includes only the bidirectional chopper type unit converter 108, and the other legs include only the full bridge type unit converter 109. In this case, it is possible to achieve an effect that each leg can be constituted by only one kind of unit converter.

Hereinafter, a ratio of a sum of the maximum output voltages of the bidirectional chopper type unit converters 108 and a sum of the maximum output voltages of the full bridge type unit converters 109 in the R phase leg 104R is indicated by mr:nr.

Similarly, a ratio of a sum of the maximum output voltages of the bidirectional chopper type unit converters 108 and a sum of the maximum output voltages of the full bridge type unit converters 109 in the S phase leg 104S is indicated by ms:ns.

Similarly, a ratio of a sum of the maximum output voltages of the bidirectional chopper type unit converters 108 and a sum of the maximum output voltages of the full bridge type unit converters 109 in the T phase leg 104T is indicated by mt:nt.

In addition, as described above, even in a case where m:n is different for each phase, the AC voltage command value generation unit 412, the DC voltage command value generation unit 413, and the DC fault detection unit 505 can be used. However, in relation to the command value distribution unit 504, methods different from that shown in FIG. 5 are used. Although not shown, an operation principle thereof will now be described.

In a case where the DC fault detection unit 505 does not detect a DC fault, that is, the DC fault detection signal D is 1, an operation of the power conversion device 102 according to a third embodiment is the same as that described with reference to FIG. 6.

In a case where the DC fault detection unit 505 detects a DC fault and varies D to 0, as in the waveforms shown in FIG. 6, output voltages of the overall bidirectional chopper type unit converters 108 are made to be zero.

During the time period when D is 0, voltage command values VRPf*, VSPf*, VTPf*, VRNf*, VSNf* and VTNf* shown in Expressions (15) to (20) are given to the full bridge groups 106RPf, 106SPf, 106TPf, 106RNf, 106SNf and 106TNf of the respective legs 104R, 104S and 104T.

$$VRPf^* = -((nr-ns+nt)/(nr+ns+nt))(VR^*-VS^*) + \\ ((nr+ns-nt)/(nr+ns+nt))(VT^*-VR^*) \quad (15)$$

$$VSPf^* = -((nr+ns-nt)/(nr+ns+nt))(VS^*-VT^*) + \\ ((-nr+ns+nt)/(nr+ns+nt))(VR^*-VS^*) \quad (16)$$

$$VTPf^* = -((-nr+ns+nt)/(nr+ns+nt))(VT^*-VR^*) + \\ ((nr+ns-nt)/(nr+ns+nt))(VS^*-VT^*) \quad (17)$$

$$VRNf^* = ((nr-ns+nt)/(nr+ns+nt))(VR^*-VS^*) - \\ ((nr+ns-nt)/(nr+ns+nt))(VT^*-VR^*) \quad (18)$$

$$VSNf^* = -((nr+ns-nt)/(nr+ns+nt))(VS^*-VT^*) - \\ ((-nr+ns+nt)/(nr+ns+nt))(VR^*-VS^*) \quad (19)$$

$$VTNf^* = ((-nr+ns+nt)/(nr+ns+nt))(VT^*-VR^*) - \\ ((nr+ns-nt)/(nr+ns+nt))(VS^*-VT^*) \quad (20)$$

Figure 10:
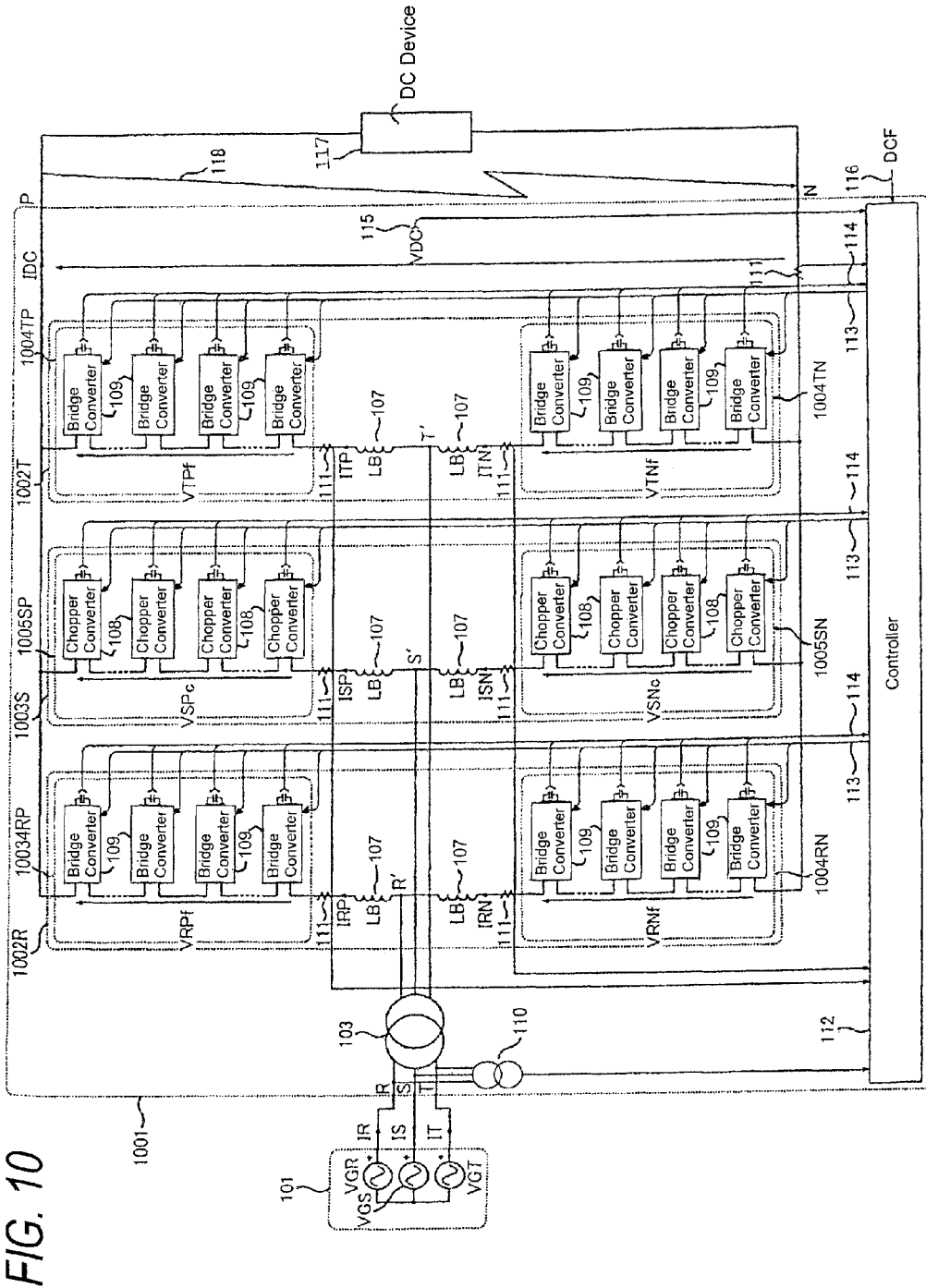
FIG. 10 is a diagram illustrating a power conversion device where a ratio of bidirectionalchopper type unit converters and full bridge type unit converters is different for each phase.

If the full bridge groups 106RPf, 106SPf, 106TPf, 106RNf, 106SNf and 106TNf are controlled based on Expressions (15) to (20) during the time period when the DC fault detection unit 505 detects a DC fault, for example, as shown in FIG. 10, even in a case where unit converters forming the S phase leg 104S are all the bidirectional chopper type unit converters 108, and unit converters forming the R phase leg 104R and the T phase leg 104T are all the full bridge type unit converter 109, that is, for example, nr:ns:nt=1:0:1, it is possible to achieve an effect that overcurrent can be prevented from flowing into the DC fault 118 from the AC system 101.

Second Embodiment

The second embodiment of the present invention will be described.

Figure 7:
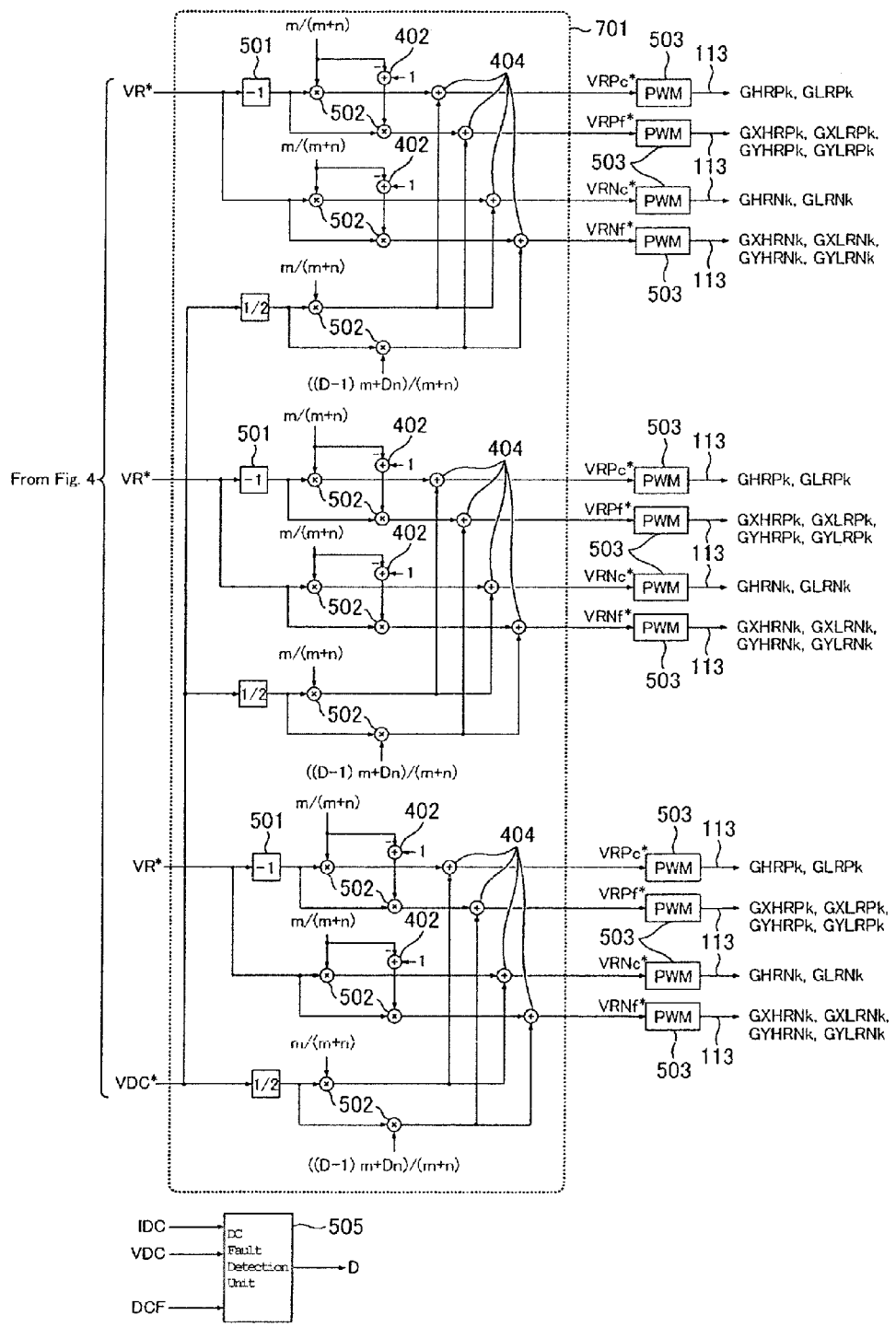
FIG. 7 is a diagram illustrating a command value distribution unit and a DC fault detection unit according to a second embodiment.

The second embodiment is characterized in that the command value distribution unit 701 shown in FIG. 7 is employed instead of the command value distribution unit 504 according to the first embodiment.

In the same manner as the first embodiment, in a case of using switching elements with the same rating as that of the MMCC-DSBC, it is possible to achieve an effect that the number of switching elements can be reduced to about ¾.

Hereinafter, description regarding FIGS. 1 to 4 showing the common configuration to the first embodiment will be omitted, and an operation of the command value distribution unit 701 shown in FIG. 7 used instead of FIG. 5 will be described.

As shown in Expressions (21) to (24), the R phase AC voltage command value VR* and the DC voltage command value VDC* are distributed to an output voltage command value VRPc* of the bidirectional chopper group 106RPc, an output voltage command value VRPf* of the full bridge group 106RPf, an output voltage command value VRNc* of the bidirectional chopper group 106RNc, and an output voltage command value VRNf* of the full bridge group 106RNf.

$$VRPc^* = -(m/(m+n))VR^* + (m/(m+n))VDC^*/2 \quad (21)$$

$$VRPf^* = -(n/(m+n))VR^* + (((D-1)m+Dn)/(m+n))VDC^*/2 \quad (22)$$

$$VRNc^* = (m/(m+n))VR^* + (m/(m+n))VDC^*/2 \quad (23)$$

$$VRNf^* = (n/(m+n))VR^* + (((D-1)m+Dn)/(m+n))VDC^*/2 \quad (24)$$

In the same manner as the first embodiment, m and n are numbers which satisfy m:n=(the maximum output voltages of the bidirectional chopper groups 106RPc and 106RNc):(the maximum output voltages of the full bridge groups 106RPf and 106RNf).

In order to suppress fault current when a DC fault described later occurs, m≤n is appropriate.

In addition, D indicates a DC fault detection signal which is output by the DC fault detection unit 505 described later, and the signal becomes 1 when a DC fault is not detected and becomes 0 when a DC fault is detected.

The second embodiment is characterized in that the DC fault detection signal D is not included in the voltage command values VRPc* and VRNc* which are given to the bidirectional chopper groups 106RPc and 106RNc unlike in the first embodiment.

Similarly, as shown in Expressions (25) to (28), the S phase AC voltage command value VS* and the DC voltage command value VDC* are distributed to an output voltage command value VSPc* of the bidirectional chopper group 106SPc, an output voltage command value VSPf* of the full bridge group 106SPf, an output voltage command value VSNc* of the bidirectional chopper group 106SNc, and an output voltage command value VSNf* of the full bridge group 106SNf.

$$VSPc^* = -(m/(m+n))VS^* + (m/(m+n))VDC^*/2 \quad (25)$$

$$VSPf^* = -(n/(m+n))VS^* + (((D-1)m+Dn)/(m+n))VDC^*/2 \quad (26)$$

$$VSNc^* = (m/(m+n))VS^* + (m/(m+n))VDC^*/2 \quad (27)$$

$$VSNf^* = (n/(m+n))VS^* + (((D-1)m+Dn)/(m+n))VDC^*/2 \quad (28)$$

Here, m, n, and D are the same numbers as described above.

Similarly, as shown in Expressions (29) to (32), the T phase AC voltage command value VT* and the DC voltage command value VDC* are distributed to an output voltage command value VTPc* of the bidirectional chopper group 106TPc, an output voltage command value VTPf* of the full bridge group 106TPf, an output voltage command value VTNc* of the bidirectional chopper group 106TNc, and an output voltage command value VTNf* of the full bridge group 106TNf.

$$VTPc^* = -(m/(m+n))VT^* + (m/(m+n))VDC^*/2 \quad (29)$$

$$VTPf^* = -(n/(m+n))VT^* + (((D-1)m+Dn)/(m+n))VDC^*/2 \quad (30)$$

$$VTNc^* = (m/(m+n))VT^* + (m/(m+n))VDC^*/2 \quad (31)$$

$$VTNf^* = (n/(m+n))VT^* + (((D-1)m+Dn)/(m+n))VDC^*/2 \quad (32)$$

Here, m, n, and D are the same numbers as described above.

As above, the operation of the command value distribution unit 701 of FIG. 7 has been described.

Hereinafter, with reference to FIG. 8, a description will be made of schematic operation waveforms in a case where the DC fault 118 occurs between the power conversion device 102 and the DC device 117 during an operation of the power conversion device 102. In addition, in the description of the waveforms, effects of the present embodiment and a mechanism thereof will be described.

Figure 8:
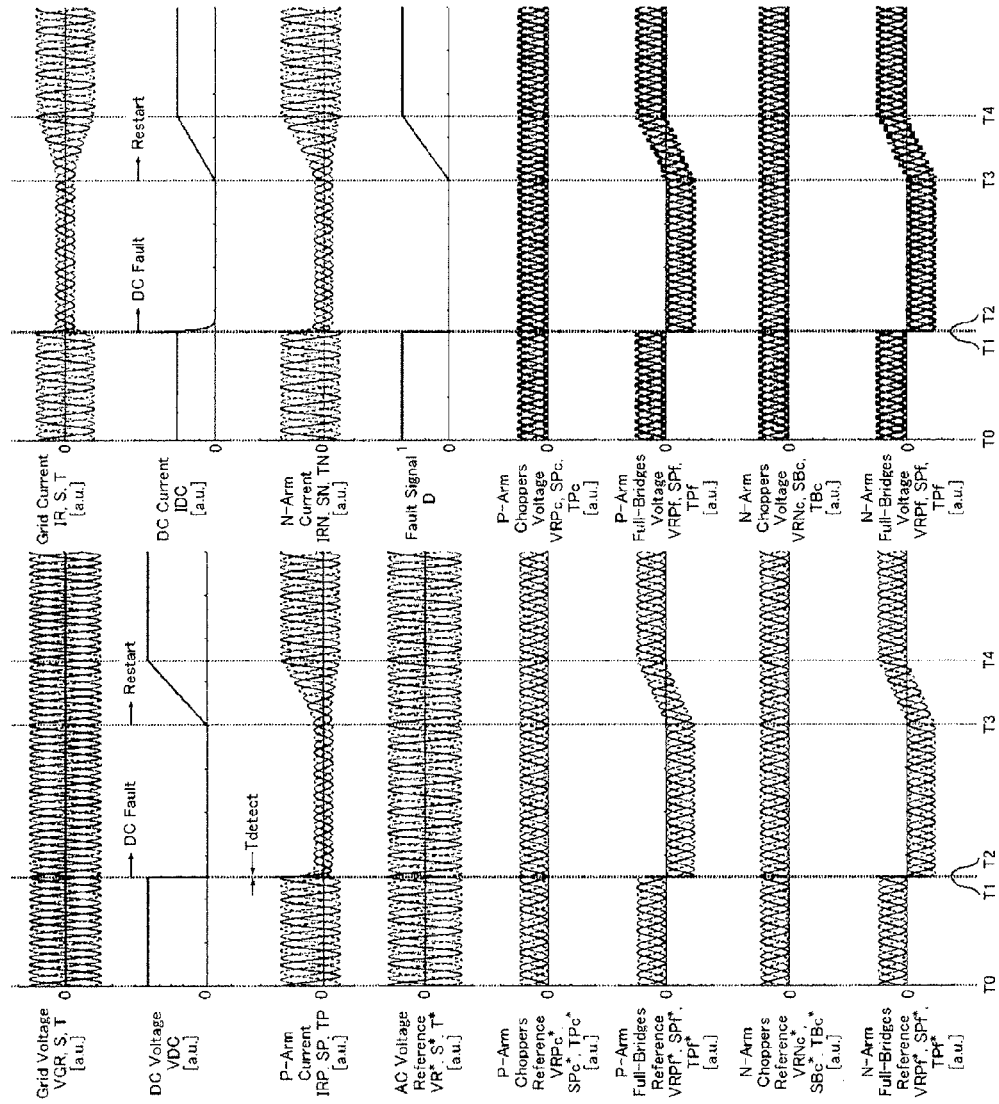
FIG. 8 is a diagram illustrating schematic operation waveforms according to the second embodiment.

FIG. 8 shows schematic waveforms of the AC system voltages VGR, VGS and VGT, the AC system currents IR, IS and IT, the DC system voltage VDC, the DC system current IDC, the currents IRP, ISP and ITP flowing through the arms 105RP, 105SP and 105TP, the currents IRN, ISN and ITN flowing through the arms 105RN, 105SN and 105TN, the AC voltage command values VR*, VS* and VT*, the DC fault detection signal D, voltage command values VRPc*, VSPc* and VTPc* given to the bidirectional chopper groups 106RPc, 106SPc and 106TPc, the output voltages VRPc, VSPc and VTPc of the bidirectional chopper groups 106RPc, 106SPc and 106TPc, the voltage command values VRPf*, VSPf* and VTPf* given to the full bridge groups 106RPf, 106SPf and 106TPf, the output voltages VRPf, VSPf and VTPf of the full bridge groups 106RPf, 106SPf and 106TP, the voltage command values VRNc*, VSNc* and VTNc* given to the bidirectional chopper groups 106RNc, 106SNc and 106TNc, the output voltages VRNc, VSNc and VTNc of the bidirectional chopper groups 106RNc, 106SNc and 106TNc, the voltage command values VRNf*, VSNf* and VTNf* given to the full bridge groups 106RNf, 106SNf and 106TNf, and the output voltages VRNf, VSNf and VTNf of the full bridge groups 106RNf, 106SNf and 106TNf.

Further, in FIG. 8, [a.u.] indicates an arbitrary unit.

In addition, FIG. 8 exemplifies waveforms in a case where a ratio of the maximum output voltage of the bidirectional chopper type unit converter 108 and the maximum output voltage of the full bridge type unit converter 109 included in a single arm 105, that is, m:n is 1:1.

During the time period between the time points T0 and T1, the d-axis and q-axis current command values Id* and Iq* have finite values, and the power conversion device 102 receives active power P and reactive power Q from the AC system 101. In addition, power which is substantially the same as the received active power P is supplied to the DC device 117.

The DC fault 118 occurs at the time point T1. If the DC fault 118 occurs at a location directly adjacent to the power conversion device 102, VDC becomes zero.

If VDC becomes zero, the overall DC voltages generated by the bidirectional chopper type unit converters 108 and the full bridge type unit converters 109 of the respective legs 104R, 104S and 104T are applied to the reactors 107RP, 107RN, 107SP, 107SN, 107TP and 107TN. For this reason, the DC system current IDC increases.

From the above description, the DC fault can be detected from the decrease in the DC system voltage VDC or the increase in the DC system current IDC.

At the time point T2, the DC fault detection unit 505 detects the DC fault, and varies the DC fault detection signal D from 1 to 0. Depending on the variation in D, the command value distribution unit 701 varies voltage command values given to the full bridge type unit converters 109.

Specifically, without varying the output voltage command values VRPc*, VSPc*, VTPc*, VRN*, VSN* and VTN* of the bidirectional chopper groups 106RPc, 106SPc, 106TPc, 106RNc, 106SNc and 106TNc, DC components of the output voltage command values VRPf*, VSPf*, VTPf*, VRN*, VSN* and VTN* of the full bridge groups 106RPf, 106SPf, 106TPf, 106RNf, 106SNf and 106TNf are varied such that DC components of the output voltage command values VRPc*, VSPc*, VTPc*, VRN*, VSN* and VTN* of the bidirectional chopper groups 106RPc, 106SPc, 106TPc, 106RNc, 106SNc and 106TNc and DC components of the output voltage command values VRPf*, VSPf*, VTPf*, VRN*, VSN* and VTN* of the full bridge groups 106RPf, 106SPf, 106TPf, 106RNf, 106SNf and 106TNf are canceled out in the arms.

In addition, in a case where the DC system voltage VDC becomes zero due to the DC fault, since power cannot be supplied to the DC device 117 even if the DC current IDC is made to flow, the power conversion device 102 makes the d-axis current feed forward value Idff* for controlling active power received from the AC system 101 become zero at the time point T2. The currents IR, IS and IT flowing through the AC system substantially include only reactive current components corresponding to q-axis currents during the time period between the time points T2 and T3.

Here, the effects achieved by the present embodiment and a mechanism thereof will be described.

During the time period between the time points T2 and T3, the DC system voltage VDC is zero, but DC components of output voltages of the bidirectional chopper type unit converters 108 and DC components of output voltages of the full bridge type unit converters 109 are substantially canceled out, and thus it is possible to prevent the DC system current IDC from being overcurrent.

On the other hand, since AC components of the output voltages of the bidirectional chopper type unit converters 108 and AC components of the output voltages of the full bridge type unit converters 109 substantially do not vary from before the DC fault detection and output AC voltages resisting against the voltages VGR, VGS and VGT of the AC system 101, it is also possible to prevent a current from flowing into the DC fault 118 from the AC system 101.

Therefore, according to the circuit configuration described with reference to FIG. 1, and the control method described with reference to FIGS. 4 and 5 in the present embodiment, it is possible to achieve an effect that overcurrent flowing when a DC fault occurs can be prevented.

In R. S. Whitehouse, "Technical Challenges of realizing multi-terminal networking with VSC", EPE 2011, the overall unit converters are full bridge type unit converters, but, in the present invention, the bidirectional chopper type unit converter 108 and the full bridge type unit converter 109 are mixed, and thereby it is possible to reduce the number of the switching elements 201.

For example, in a case where all the switching elements 201 have the same rating, and m:n is 1:1, it is possible to achieve an effect that the number of the switching elements 201 can be reduced to ¾.

Meanwhile, after the DC fault 118 is removed at anytime point of the time period between the time points T2 and T3, the DC fault detection unit 505 gradually returns the DC fault detection signal D to 1 from 0 during the time period of the time points T3 and T4.

Depending on the variation in D, the command value distribution unit 701 returns the output voltage command values VRPf*, VSPf*, VTPf*, VRNf*, VSNf* and VTNf* of the full bridge groups 106RPf, 106SPf, 106TPf, 106RNf, 106SNf and 106TNf, to the waveforms before the DC fault occurs, that is, the same waveforms as those during the time period between the time points T0 and T1.

In addition, the d-axis current feed forward Idff* is returned to the same waveform as that during the time period between the time point T0 and T1, and thus the currents IR, IS and IT flowing through the AC system are also returned to the same waveforms as those during the time period between the time points T0 and T1.

As above, the schematic operation waveforms according to the present embodiment, the effects achieved by the present embodiment and the mechanism thereof have been described with reference to FIG. 8.

Third Embodiment

The third embodiment of the present embodiment will be described.

Figure 11:
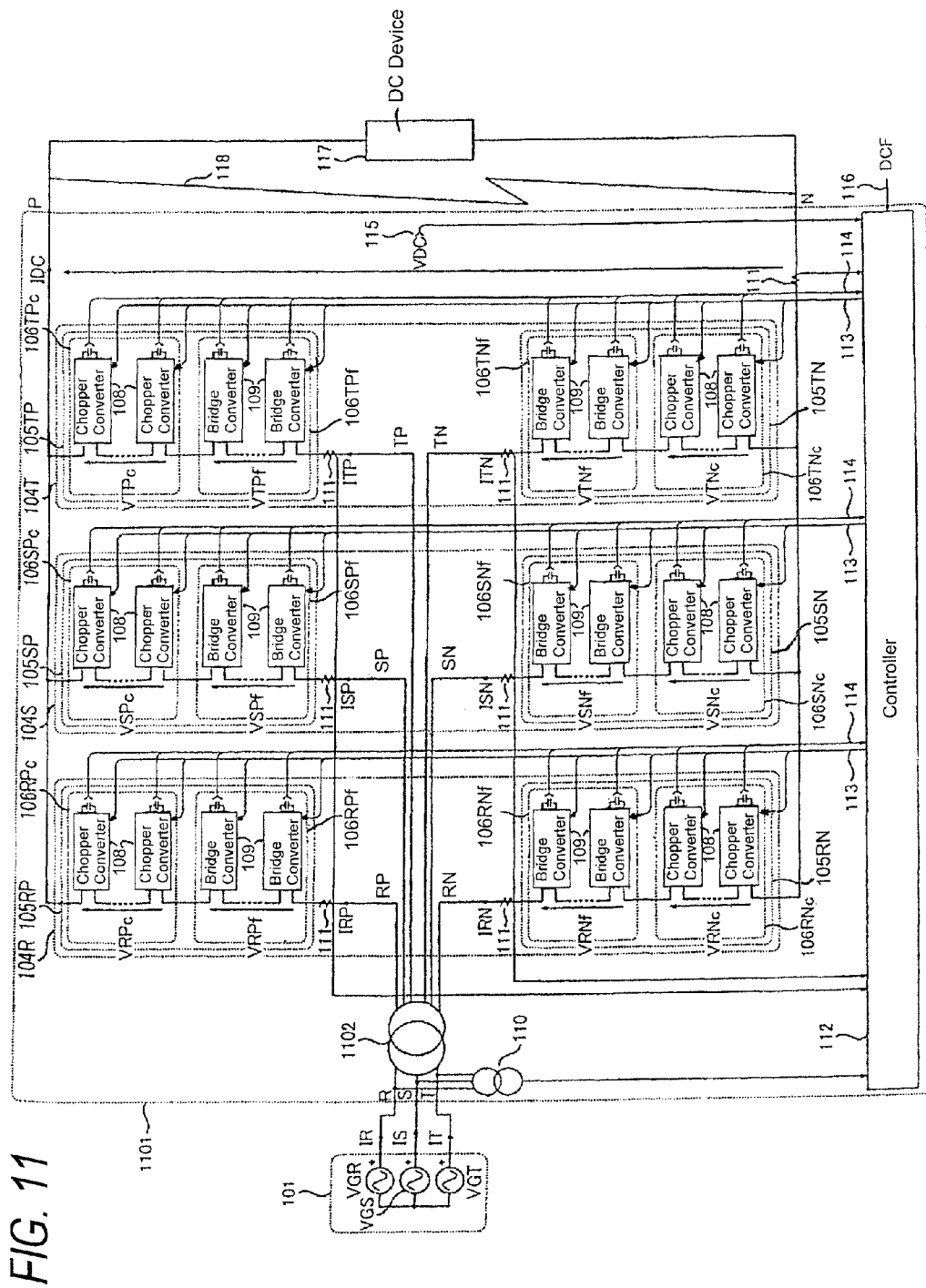
FIG. 11 is a diagram illustrating a power conversion device according to a third embodiment of the present invention.

As compared with the power conversion device 102 shown in FIG. 1 according to the first and second embodiments, a power conversion device 1101 of FIG. 11 described in the present invention is characterized in that a double Y-connection transformer 1102 is used instead of the transformer 103 and the reactors 107RP, 107SP, 107TP, 107RN, 107SN and 107TN.

In the present embodiment, it is possible to achieve an effect of the reactors 107 can be omitted in addition to the effects achieved by the first and second embodiments.

Figure 12:
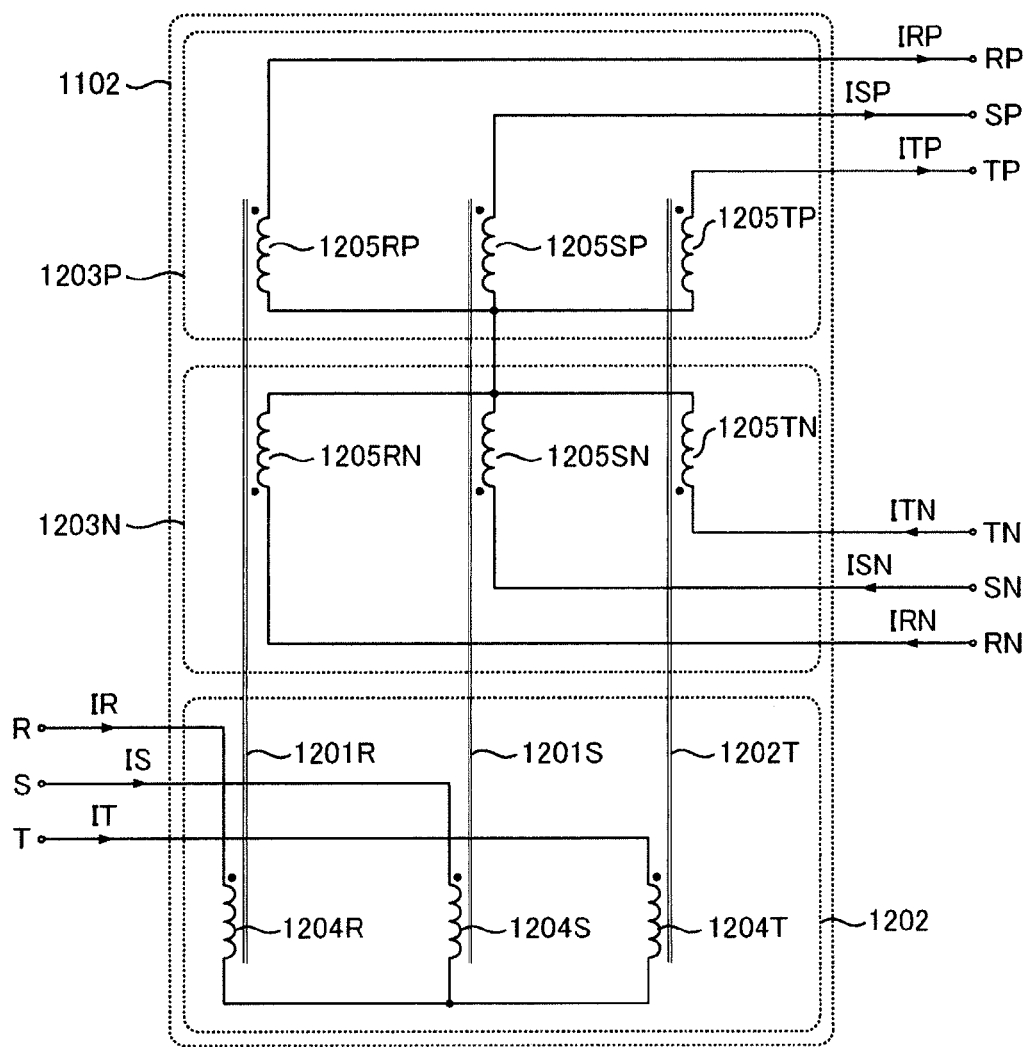
FIG. 12 is a diagram illustrating a double Y-connection transformer.

Hereinafter, a configuration according to the third embodiment will be described with reference to FIGS. 11 and 12, and the description is restricted to differences from the first and second embodiments.

The double Y-connection transformer 1102 has a P side secondary winding 1203P and an N side secondary winding 1203N described later. In addition, FIG. 12 shows a winding structure of the double Y-connection transformer 1102, and details thereof will be described later.

As shown in FIG. 11, terminals of the P side secondary winding 1203P are referred to as an RP point, an SP point, and a TP point, which are respectively connected to the RP arm 105RP, the SP arm 105SP, and the TP arm 105TP.

Similarly, as shown in FIG. 11, terminals of the N side secondary winding 1203N are referred to as an RN point, an SN point, and a TN point, which are respectively connected to the RN arm 105RN, the SP arm 105SN, and the TN arm 105TN.

Hereinafter, a configuration of the double Y-connection transformer 1102 will be described with reference to FIG. 12.

The double Y-connection transformer includes an iron core 1201 which has at least three legs 1201R, 1201S and 1201T, and, an R phase primary winding 1204R, an S phase primary winding 1204S, and a T phase primary winding 1204T are wound thereon, respectively. In FIG. 12, the three primary windings 1204R, 1204S and 1204T form a start-connection but may form a delta-connection.

The P side secondary winding 1203P includes an R phase P side secondary winding 1205RP, an S phase P side secondary winding 1205SP, and a T phase P side secondary winding 1205TP which are respectively wound on the legs 1201R, 1201S and 1201T so as to form a star-connection.

The N side secondary winding 1203N includes an R phase N side secondary winding 1205RN, an S phase N side secondary winding 1205SN, and a T phase N side secondary winding 1205TN which are respectively wound on the legs 1201R, 1201S and 1201T so as to form a star-connection.

Here, the R phase P side secondary winding 1205RP and the R phase N side secondary winding 1205RN wound on the leg 1201R are magnetically coupled to each other such that the magnetomotive forces thereof have opposite polarities.

Similarly, the S phase P side secondary winding 1205SP and the S phase N side secondary winding 1205SN wound on the leg 1201S are magnetically coupled to each other such that the magnetomotive forces thereof have opposite polarities.

Similarly, the T phase P side secondary winding 1205TP and the T phase N side secondary winding 1205TN wound on the leg 1201T are magnetically coupled to each other such that the magnetomotive forces thereof have opposite polarities.

In addition, a point for forming the star-connection of the P side secondary winding 1203P is electrically connected to a point for forming the star-connection of the N side secondary winding 1203N.

By using the double Y-connection transformer, it is possible to achieve an effect that the reactors 107 can be omitted.

Further, in the present embodiment, the AC voltage command value generation unit 412, the DC voltage command value generation unit 413, and the command value distribution units 504 and 701 described in the first and second embodiments can be used, and, the power conversion device 1101 can be controlled using the same control method as the control method described in the first and second embodiments.

What is claimed is:

1. A power conversion device comprising:
   at least three windings including first to three windings;
   a first arm formed by connecting at least two unit converters in series;
   a second arm formed by connecting at least two unit converters in series;
   a first serial circuit and a second serial circuit connected in series, the first serial circuit being formed by connecting the second winding in series to the first arm, and the second serial circuit being formed by connecting the third winding in series to the second arm; and
   at least one circuit where the first, second and third windings are magnetically coupled to each other such that magnetomotive forces of the second and third windings have opposite polarities,
   wherein a terminal of the first winding is set to an AC terminal, and both ends of a serial circuit of the first serial circuit and the second serial circuit are set to DC terminals, and
   wherein the first and second arms are formed using at least two kinds of unit converters including a first type unit converter capable of outputting a unipolar voltage and a second type unit converter capable of outputting a bipolar voltage.

2. A power conversion device comprising:
   at least two legs connected in parallel, each of which includes at least two unit converters connected in series,
   wherein a first location of the leg is set to an AC side connection location, and a second location of the leg is set to a DC side connection location, and wherein at least one of the legs is formed using at least two kinds of unit converters including a first type unit converter capable of outputting a unipolar voltage and a second type unit converter capable of outputting a bipolar voltage;

command value generation means for generating an AC voltage command value and a DC voltage command value;

command value distribution means for distributing the AC voltage command value to the first type unit converter and the second type unit converter at a ratio of m:n (where m and n are any positive real numbers) and distributing the DC voltage command value to the first type unit converter and the second type unit converter at a ratio of m:n; and DC fault detection means for detecting a DC fault when a current of a DC system is larger than a preset value, a voltage of the DC system is smaller than a preset value, or an external signal is received, wherein, when the DC fault detection means detects a DC fault, the command value distribution means has a function of changing a distribution ratio of the AC voltage command value given to the first type unit converter and the second type unit converter from m:n to 0:(m+n) and changing the DC voltage command value given to the first type unit converter and the second type unit converter to substantially zero.

3. The power conversion device according to claim 2, wherein a sum of the maximum output voltages of the second type unit converters is equal to or larger than an output voltage of the first type unit converter.

4. The power conversion device according to claim 2, wherein the AC terminal is linked to an AC system via a transformer, and
wherein a sum of the maximum output voltages of the second type unit converters is equal to or larger than a voltage obtained by multiplying a phase voltage amplitude of the AC system by a transformation ratio of the transformer.

5. The power conversion device according to claim 2, wherein the AC terminal is directly linked to an AC system, and
wherein a sum of the maximum output voltages of the second type unit converters is equal to or larger than a phase voltage amplitude of the AC system.

6. The power conversion device according to claim 2, wherein, when one of the second type unit converters fails and is thus short-circuited, the command value distribution means has a function of varying m:n to m:(n−Δn) in an arm including the second type unit converters by using Δn as a ratio of the maximum output voltage of the failed second type unit converter and a sum of maximum output voltages of all of the second type unit converters in the arm including the second type unit converters.

7. The power conversion device according to claim 6, wherein the DC fault detection means changes the fault signal D from 0 to 1 instantaneously, or in a ramp function form, or with any path.

8. The power conversion device according to claim 2, further comprising:
command value generation means for generating an AC voltage command value and a DC voltage command value;
DC fault detection means for generating a fault signal D which is varied from 1 to 0 when a current of a DC system is larger than a preset value, a voltage of the DC system is smaller than a preset value, or an external signal is received; and
command value distribution means for distributing the AC voltage command value to the first type unit converter and the second type unit converter at a ratio of $D^a$m:(1−$D^a$)m+n (where a, m, and n are any positive real numbers) and distributing a signal obtained by multiplying the DC voltage command value by $D^b$ (where b is any positive real number) to the first type unit converter and the second type unit converter at a ratio of m:n.

9. The power conversion device according to claim 8, wherein the DC fault detection means changes the fault signal D from 0 to 1 instantaneously, or in a ramp function form, or with any path.

10. The power conversion device according to claim 2, wherein, when one of the first type unit converters fails and is thus short-circuited, the command value distribution means has a function of varying m:n to (m−Δm):n in an arm including the first type unit converters by using Δm as a ratio of the maximum output voltage of the failed first type unit converter and a sum of maximum output voltages of all of the first type unit converters in the arm including the first type unit converters.

11. The power conversion device according to claim 10, wherein the DC fault detection means changes the fault signal D from 0 to 1 instantaneously, or in a ramp function form, or with any path.

12. The power conversion device according to claim 2, further comprising:
command value generation means for generating an AC voltage command value and a DC voltage command value;
DC fault detection means for generating a fault signal D which is varied from 1 to 0 when a current of a DC system is larger than a preset value, a voltage of the DC system is smaller than a preset value, or an external signal is received; and
command value distribution means for distributing the AC voltage command value to the first type unit converter and the second type unit converter at a ratio of m:n (where m and n are any positive real numbers) and distributing the DC voltage command value to the first type unit converter and the second type unit converter at a ratio of m:($D^b$−1)m+$D^b$n (where b is any positive real number).

13. The power conversion device according to claim 12, wherein the DC fault detection means changes the fault signal D from 0 to 1 instantaneously, or in a ramp function form, or with any path.

14. A power conversion device comprising:
at least two legs connected in parallel, each of which includes at least two unit converters connected in series,
wherein a first location of the leg is set to an AC side connection location, and a second location of the leg is set to a DC side connection location, and
wherein at least one of the legs is formed using at least two kinds of unit converters including a first type unit converter capable of outputting a unipolar voltage and a second type unit converter capable of outputting a bipolar voltage;
command value generation means for generating an AC voltage command value and a DC voltage command value;
command value distribution means for distributing the AC voltage command value to the first type unit converter and the second type unit converter at a ratio of m:n (where m and n are any positive real numbers) and distributing the DC voltage command value to the first type unit converter and the second type unit converter at a ratio of m:n; and DC fault detection means for detecting a DC fault when a current of a DC system is larger than a preset value, a voltage of the DC system is smaller than a preset value, or an external signal is received, wherein, when the DC fault detection means detects a DC fault, the command value distribution means has a function of changing a distribution ratio of the DC voltage command value given to the first type unit converter and the second type unit converter from m:n to m:−m.

* * * * *